(12) United States Patent
Yamada et al.

(10) Patent No.: US 11,605,807 B2
(45) Date of Patent: Mar. 14, 2023

(54) ELECTRODE GROUP, NONAQUEOUS ELECTROLYTE SECONDARY BATTERY, BATTERY PACK, AND VEHICLE

(71) Applicant: KABUSHIKI KAISHA TOSHIBA, Minato-ku (JP)

(72) Inventors: Arisa Yamada, Kawasaki (JP); Yasunobu Yamashita, Tokyo (JP); Shinsuke Matsuno, Tokyo (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 246 days.

(21) Appl. No.: 16/804,320

(22) Filed: Feb. 28, 2020

(65) Prior Publication Data

US 2021/0091370 A1  Mar. 25, 2021

(30) Foreign Application Priority Data

Sep. 19, 2019 (JP) .............. JP2019-170919
Jan. 20, 2020 (JP) .............. JP2020-007133

(51) Int. Cl.
*H01M 4/131* (2010.01)
*H01M 4/46* (2006.01)
*H01M 10/0525* (2010.01)
*H01M 50/20* (2021.01)
*H01M 50/46* (2021.01)

(52) U.S. Cl.
CPC ........... *H01M 4/131* (2013.01); *H01M 4/463* (2013.01); *H01M 10/0525* (2013.01); *H01M 50/20* (2021.01); *H01M 50/46* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 2016/0254511 A1 | 9/2016 | Hatta et al. | |
| 2018/0277902 A1* | 9/2018 | Jin | H01M 50/538 |
| 2018/0277907 A1* | 9/2018 | Iwasaki | H01M 10/0525 |

FOREIGN PATENT DOCUMENTS

| | | |
|---|---|---|
| EP | 2 978 060 A1 | 1/2016 |
| JP | 2003-173770 A | 6/2003 |
| JP | 2009-146822 A | 7/2009 |
| JP | 2015-53288 A | 3/2015 |
| JP | 2018-137097 A | 8/2018 |
| WO | WO2013/140565 A1 | 9/2013 |
| WO | WO 2015/068325 A1 | 5/2015 |

* cited by examiner

Primary Examiner — Wyatt P McConnell
(74) Attorney, Agent, or Firm — Oblon, McClelland, Maier & Neustadt, L.L.P.

(57) ABSTRACT

According to one embodiment, an electrode group is provided. The electrode group includes a positive electrode that includes a lithium composite oxide $LiM_xMn_{2-x}O_4$ ($0 < x \leq 0.5$, M is at least one selected from a group consisting of Ni, Cr, Fe, Cu, Co, Mg, and Mo) as a positive electrode active material, a negative electrode that includes a negative electrode active material, a composite electrolyte layer that includes at least one of a solid electrolyte and an inorganic compound containing alumina, and a separator. The composite electrolyte layer and the separator are arranged between the positive electrode and the negative electrode. A density of the composite electrolyte layer is in the range of 1.0 g/cc and 2.2 g/cc.

19 Claims, 7 Drawing Sheets

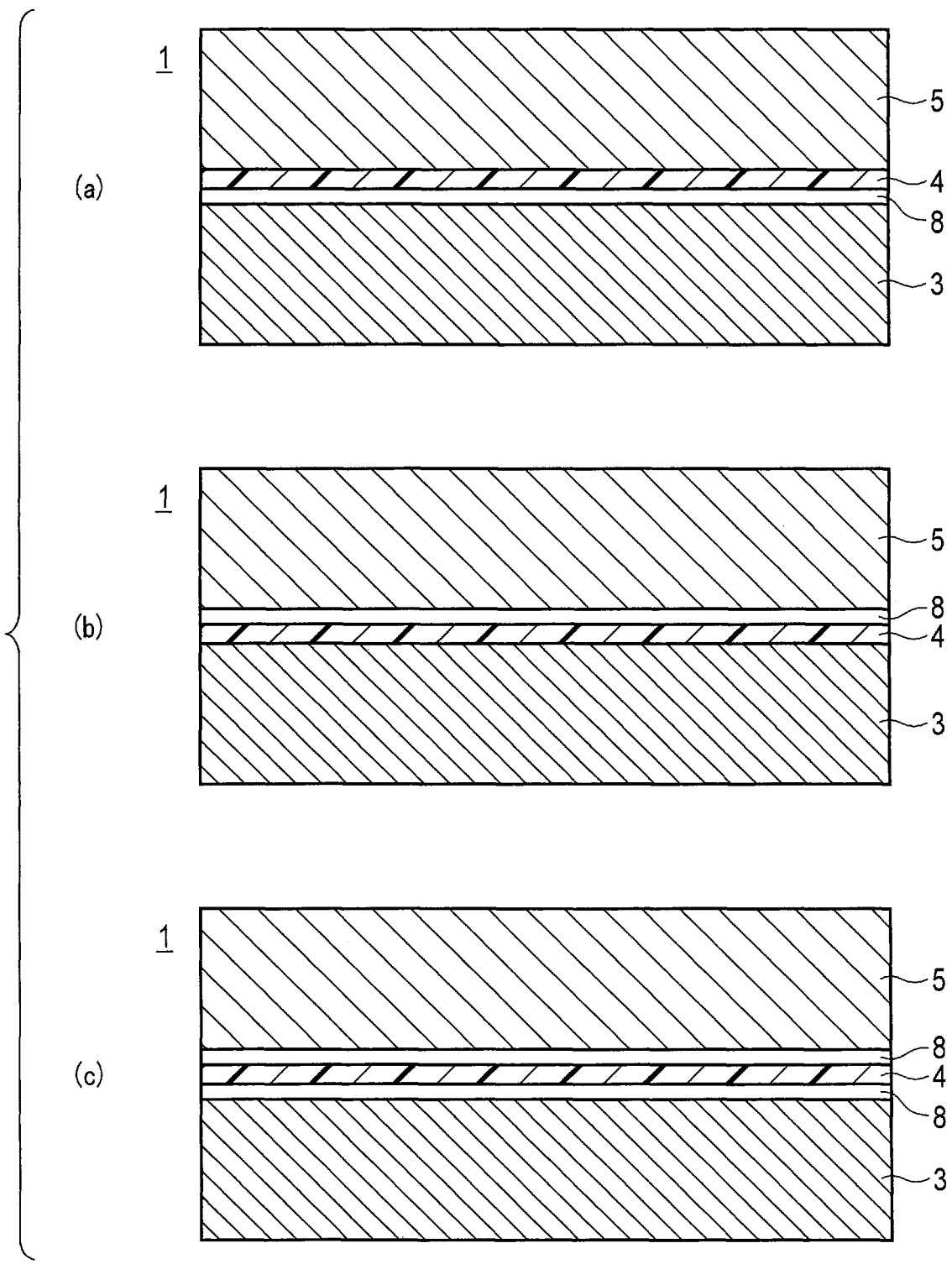
F I G. 1

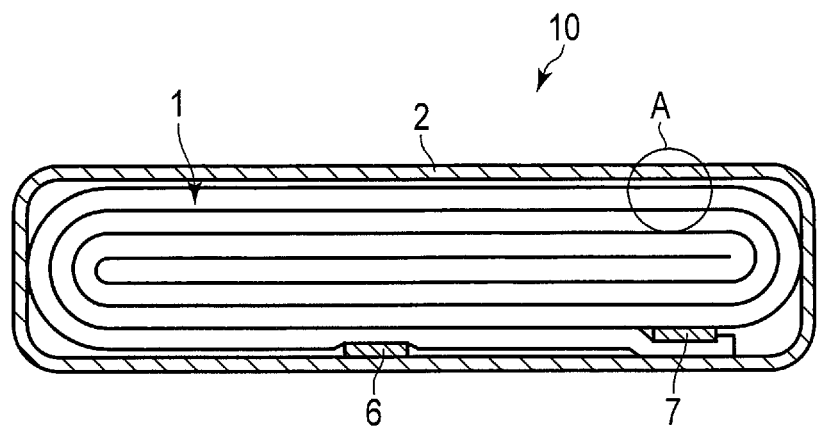
F I G. 2
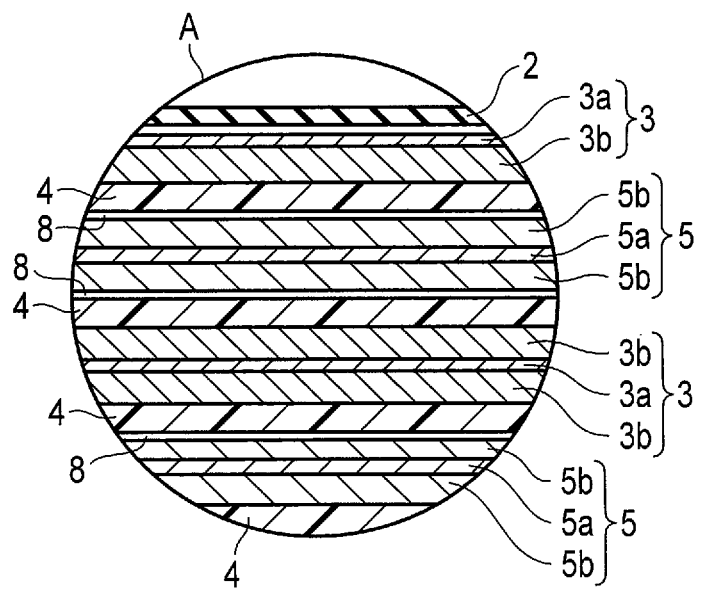
F I G. 3

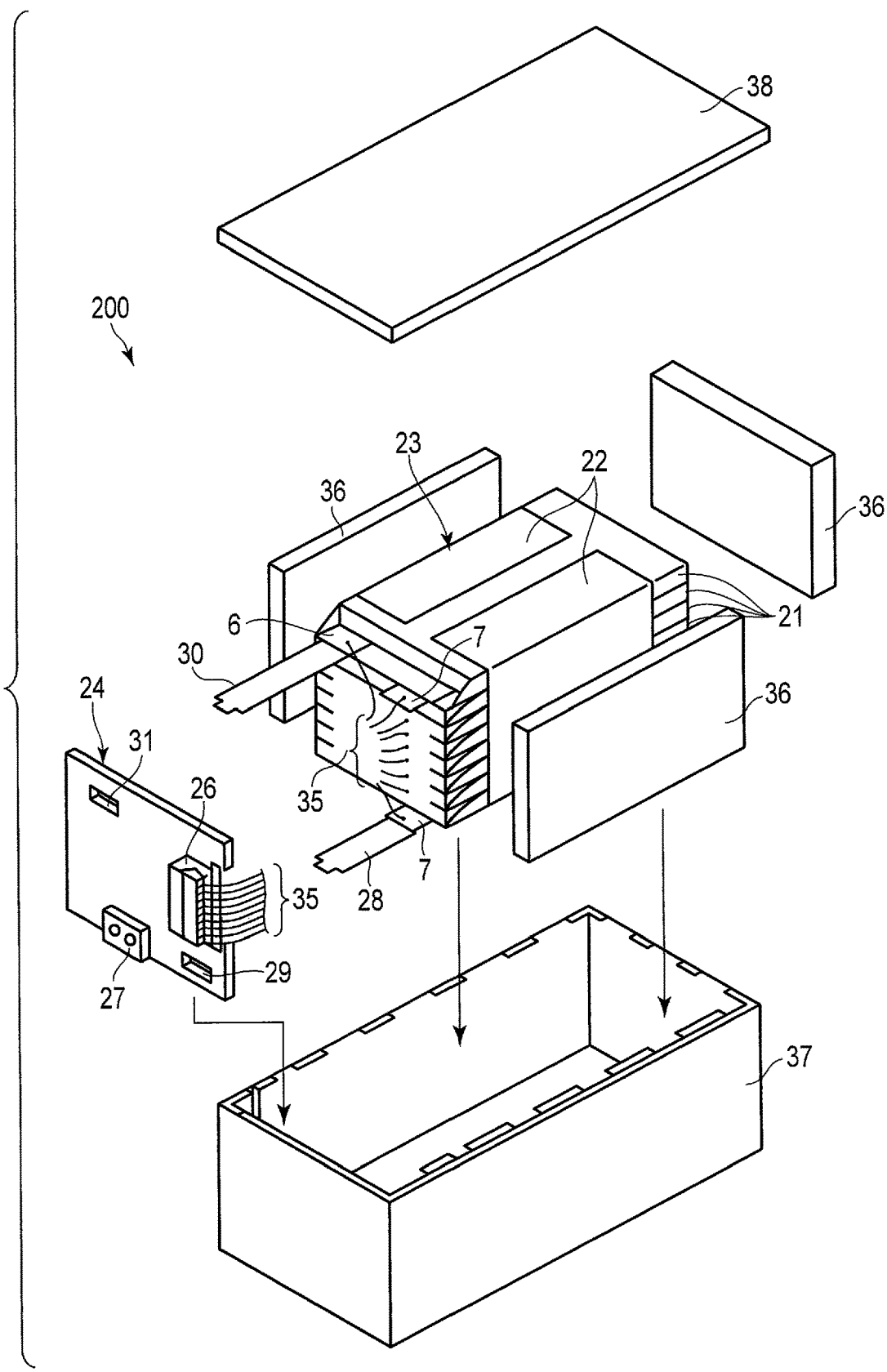
F I G. 7

ELECTRODE GROUP, NONAQUEOUS ELECTROLYTE SECONDARY BATTERY, BATTERY PACK, AND VEHICLE

CROSS-REFERENCE TO RELATED APPLICATIONS

This application is based upon and claims the benefit of priority from prior Japanese Patent Applications No. 2019-170919, filed Sep. 19, 2019; and No. 2020-007133, filed Jan. 20, 2020, the entire contents of all of which are incorporated herein by reference.

FIELD

Embodiments described herein relate generally to an electrode group, a nonaqueous electrolyte, a secondary battery, a battery pack, and a vehicle.

BACKGROUND

In recent years, research and development into high-energy density batteries such as lithium-ion secondary batteries and nonaqueous electrolyte secondary batteries has gathered pace. Nonaqueous electrolyte secondary batteries are expected to be used as power sources for hybrid vehicles and electric vehicles, and for an uninterruptible power supply for mobile phone base stations. In particular, a battery using lithium nickel manganese oxide (LNMO) having a high discharging potential of 4.7 V (vs Li/Li$^+$) as a positive electrode active material achieves a high energy density; therefore, such a battery has attracted attention.

However, since the discharging potential of the LNMO is extremely noble, an organic solvent contained in the nonaqueous electrolyte in the positive electrode decomposes, which causes gas generation and battery swelling.

In Patent Literature 1 "JP-A-2003-173770", an electrode active material is coated entirely with a lithium-conductive glass so as to prevent contact with an organic solvent and suppress generation of a gas. However, since lithium-ion conductivity of the lithium conductive glass is lower than that of the organic solvent, coating of the active material with the lithium conductive glass would result in an increase of the resistance and deterioration of rate characteristics.

BRIEF DESCRIPTION OF THE DRAWINGS

FIG. 1 is a cross-sectional conceptual diagram of an electrode group according to a first embodiment.

FIG. 2 is a cross-sectional schematic view showing an example of a nonaqueous electrolyte secondary battery according to a second embodiment.

FIG. 3 is an enlarged cross-sectional schematic view of part A shown in FIG. 2.

FIG. 7 is an exploded perspective view of a battery pack of an example according to the third embodiment.

DETAILED DESCRIPTION

Figure 4:
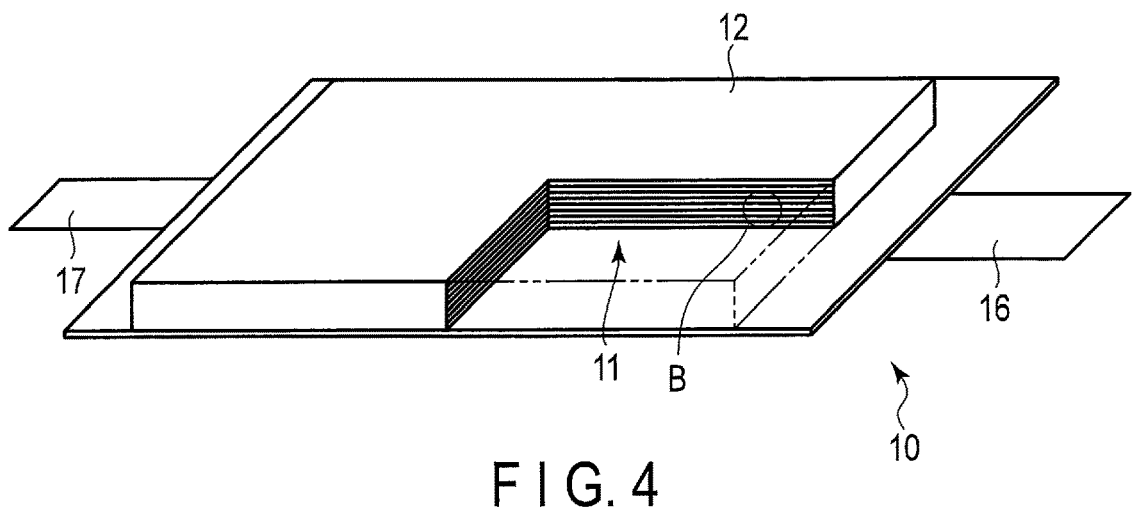
FIG. 4 is a partial broken perspective view showing another example of a nonaqueous electrolyte secondary battery according to a second embodiment.

According to the embodiment, an electrode group is provided. The electrode group includes a positive electrode that includes a lithium composite oxide LiM$_x$Mn$_{2-x}$O$_4$ (0<x≤0.5, M is at least one selected from a group consisting of Ni, Cr, Fe, Cu, Co, Mg, and Mo) as a positive electrode active material, a negative electrode that includes a negative electrode active material, a composite electrolyte layer that includes at least one of a solid electrolyte and an inorganic compound containing alumina, and a separator. The composite electrolyte layer and the separator are arranged between the positive electrode and the negative electrode. A density of the composite electrolyte layer is in the range of 1.0 g/cc and 2.2 g/cc.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

FIG. 1 is a cross-sectional conceptual diagram of an electrode group according to a first embodiment. The electrode group shown in FIG. 1a according to the first embodiment includes a positive electrode 5, a composite electrolyte layer 8, a separator 4, and a negative electrode 3. The electrode group shown in FIG. 1b according to the first embodiment includes a positive electrode 5, a separator 4, a composite electrolyte layer 8, and a negative electrode 3. The electrode group shown in FIG. 1c according to the first embodiment includes a positive electrode 5, a composite electrolyte layer 8, a separator 4, a composite electrolyte layer 8, and a negative electrode 3. In the following, the composite electrolyte layer, the separator, the positive electrode, and the negative electrode that constitute the electrode group are described in detail. When the positive electrode and the negative electrode are generically described, they may be referred to as "the electrode".

(Composite Electrolyte Layer)

A composite electrolyte layer is formed between the positive electrode and the negative electrode, and the density thereof is in a range of 1.0 g/cc to 2.2 g/cc. The composite electrolyte layer includes a solid electrolyte (which will be described later), and this solid electrolyte preferably has a lithium-ion conductivity of 1×10$^{-10}$ S/cm or greater at a temperature of 25° C. The composite electrolyte layer may be mixed with a binder and then formed on the negative electrode or on the positive electrode. Thus, the composite electrolyte layer can be arranged as shown in FIGS. 1a and 1b, and the composite electrolyte layer and the separator (which will be described later), and the electrode can be arranged in this order. As shown in FIG. 1c, the composite electrolyte layer may be arranged on both main surfaces of the separator. In other words, the composite electrolyte layer may be formed so as to face each of the positive electrode and the negative electrode. When forming the composite electrolyte layer, it is possible to apply it directly to the electrode, or to the separator, for example. The order of lamination may be the separator, the composite electrolyte layer, the electrode. Alternatively, the composite electrolyte layer may be made face the electrode with the separator being interposed therebetween; in other words, the order of lamination may be the composite electrolyte layer, the separator, and the electrode. The composite electrolyte layer may include inorganic particles, a plasticizer, and a dispersant, etc., other than solid electrolyte particles. The electrode and the composite electrolyte layer are not necessarily in contact. The electrode and the separator are not necessarily in contact. The composite electrolyte layer and the separator are not necessarily in contact.

Since the density of the composite electrolyte layer is in the range of 1.0 g/cc to 2.2 g/cc, it is possible to suppress the movement of decomposition products of an organic solvent contained in the nonaqueous electrolyte, and for the composite electrolyte layer to retain an appropriate amount of the nonaqueous electrolyte. Examples of the decomposition products of the organic solvent are water and alcohol. The movement of the decomposition products of the organic solvent is a movement of any generated decomposition product of the organic solvent between the positive and negative electrodes through the separator. Due to the movement of the decomposition products of the organic solvent, the decomposition products generated, for example, on the positive electrode, move to and are reduced on the negative electrode; thus, generation of gas such as hydrogen is expedited. For this reason, the gas generation in a secondary battery can be suppressed if the movement of the decomposition products generated from the organic solvent can be suppressed, and life performance can be thereby improved. Furthermore, the retaining of the nonaqueous electrolyte to an appropriate extent allows lithium ions to move.

If the density of the composite electrolyte layer is less than 1.0 g/cc, the movement of the decomposition products of the organic solvent cannot be suppressed, and if the density is greater than 2.2 g/cc, the capability of the separator to maintain the nonaqueous electrolyte is deteriorated. The deterioration of the capability of the composite electrolyte layer to retain the nonaqueous electrolyte is not preferable, because it causes deterioration of the ion conductivity. The density of the composite electrolyte layer is more preferably in the range of 1.3 g/cc to 1.5 g/cc. If the density of the composite electrolyte layer falls within this range, it is possible to suppress the movement of the decomposition products of the organic solvent, and to maintain the capability of the composite electrolyte layer to retain the nonaqueous electrolyte.

It is preferable that the density of the composite electrolyte layer be substantially consistent within the composite electrolyte layer. In other words, it is preferable that the distribution of the density in the composite electrolyte layer fall within the range of 1.0 g/cc to 2.2 g/cc, and that there be no portion having a density distribution in the composite electrolyte layer beyond the density range defined in the present invention. This is because a portion where the density in the composite electrolyte layer falls out of the range of 1.0 g/cc and 2.2 g/cc will cause there to be a portion where the capability of the composite electrolyte layer to retain the nonaqueous electrolyte is deteriorated as described above, or a portion where the movement of the decomposition products of the organic solvent cannot be suppressed, and such portions lead to failure in the suppression of gas generation and the maintenance of ion conductivity.

The thickness of the composite electrolyte layer is preferably in the range of 0.1 μm to and 100 μm. If the composite electrolyte layer is too thin, a layer of the solid electrolyte will also be thin, and it will become difficult to suppress the movement of the decomposition products of the organic solvent; if the composite electrolyte layer is too thick on the other hand, the resistance will become large, and the life performance will be deteriorated. The more preferable range is from 1 μm to 20 μm. This range can achieve both the movement of the decomposition products of the organic solvent and the suppression of the resistance of the composite electrolyte layer.

Since the composite electrolyte layer contains a solid electrolyte, the composite electrolyte layer can allow only lithium ions to pass through. For this reason, it is possible to block the movement of the decomposition products of the organic solvent without inhibiting the movement of cations through the formation of the composite electrolyte layer on the positive electrode, the negative electrode, or the separator, without a need to cover the active material.

The lithium-ion conductivity of the separator solid electrolyte belonging to the electrode group according to the first embodiment at the temperature of 25° C. is preferably $1 \times 10^{-10}$ S/cm or greater. If the lithium-ion conductivity of the solid electrolyte at the temperature of 25° C. is $1 \times 10^{-10}$ S/cm or greater, the lithium-ion concentration in the vicinity of the particle surfaces tends to be higher, thereby improving the rate performance and the life performance. More preferably, the lithium-ion conductivity of the solid electrolyte at the temperature of 25° C. is $1 \times 10^{-6}$ S/cm or greater. This is because the lithium-ion concentration in the vicinity of the solid electrolyte surface tends to become higher if the lithium-ion conductivity of the solid electrolyte at the temperature of 25° C. is $1 \times 10^{-6}$ S/cm or greater, thereby improving the rate performance and the life performance. The upper limit value of the lithium-ion conductivity is, for example, $2 \times 10^{-2}$ S/cm.

The solid electrolyte includes, for example, at least one selected from the group consisting of a sulfide-based $Li_2SeP_2S_5$-type glass ceramic, a lithium lanthanum titanium composite oxide (e.g., $Li_{0.5}La_{0.5}TiO_3$) which is an inorganic compound having a perovskite-type structure, an inorganic compound having a LISICON-type structure (e.g., $Li_{3.6}Si_{0.6}P_{0.4}O_4$), LATP ($Li_{1+x}Al_xTi_{2-x}(PO_4)_3$) ($0.1 \leq x \leq 0.4$) having a NASICON-type skeleton, $Li_{3.6}Si_{0.6}PO_4$, amorphous LIPON ($Li_{2.9}PO_{3.3}N_{0.46}$), a lithium calcium zirconium oxide, and an inorganic compound having a garnet-type structure. One, or two or more types of the inorganic compounds may be used as the particles of the solid electrolyte. The particles of the solid electrolyte may consist of a mixture of the several types of inorganic compounds.

If the solid electrolyte particles contain a sulfur element, the sulfur component is dissolved into the organic electrolyte, which is not preferable. It is therefore preferable that the inorganic component particles do not contain a sulfur element.

Preferable inorganic component particles are oxides such as LATP having a NASICON-type skeleton, amorphous LIPON, and a garnet-type lithium lanthanum zirconium-containing oxide (e.g., $Li_7La_3Zr_2O_{12}$: LLZ).

Among these, the inorganic compound particles are preferably inorganic compounds having a garnet-type structure. It is preferable that the inorganic compound particles be an inorganic compound having a garnet-type structure because these have high Li-ion conductivity and reduction resistance, and a wide electrochemical window.

The solid electrolyte may take a form of particles. For this reason, the solid electrolyte may be referred to as solid electrolyte particles. The shape of the solid electrolyte is not particularly limited, and may be a spherical shape, an elliptical shape, a flat shape, or a fibrous shape.

The average particle size of the solid electrolyte particles is preferably in the range of 0.1 μm to 10 μm. If the average particle size of the solid electrolyte particles is less than 0.1 μm, an amount of the solvent contained in the solid electrolyte particles becomes too large; as a result, the decomposition reaction of the nonaqueous electrolyte is excessively stimulated, and the battery performance is deteriorated (deteriorated rate performance and shorter life of the battery, etc.), which is not preferable.

If the average particle size of the solid electrolyte becomes 10 μm or greater, the gaps between the particles increase; as a result, the ion conductivity of the solid electrolyte particles is reduced, which is not preferable. If the average particle size of the solid electrolyte particles is too large, it becomes difficult to make the composite electrolyte layer sufficiently thin at the time when the solid electrolyte particles into the electrolyte so as to form the composite electrolyte layer (described later) between the positive and negative electrodes. As a result, the distance between the positive and negative electrodes increases, and the diffusion resistance of the lithium ions increases, which is not preferable.

The range of 0.1 μm to 5 μm is more preferable. This range adequately stimulates the decomposition reaction of the electrolyte, and the gaps between the solid electrolyte particles are also proper; thus, it is possible to keep better ion conductivity for the solid electrolyte particles.

An average particle size of the solid electrolyte particles can be measured as follows. An electrode taken out from a battery is washed with an appropriate solvent, and dried. For example, ethyl methyl carbonate may be used as a solvent for the washing. The drying takes place in the atmosphere. Thereafter, the electrode is cut in the direction of the short side, and ten points at equal intervals are selected on the section, excluding portions at each end of the section that each constitute 10% length of the area of the section. The selected 10 points are observed with 10,000× magnification using a scanning electron microscope (SEM). Ten particles are chosen per selected point, and a particle size is measured for each particle. In order to do so, easy-to-observe particles are selected. Measurement results thus obtained are input with a use of spreadsheet software. An average particle size is calculated by excluding excessively large or small particles.

The binder is, for example, a high polymer material that gels with an organic solvent such as carbonates. Examples of the binder include: polyacrylonitrile (PAN), polyethylene oxide (PEO), polyvinylidene fluoride (PVdF), and polymethyl methacrylate. One of the above binders may be used alone, or a plurality of them may be used in combination.

The ratio of the weight of the binder to the weight of the composite electrolyte layer is, for example, in the range of 0.1% by weight to 10% by weight, preferably in the range of 0.5% by weight to 5% by weight. If the ratio of the weight of the binder to the weight of the composite electrolyte layer is excessively low, the binding force is weak and the composite electrolyte layer gets easily peeled off; as a consequence, the composite electrolyte layer becomes unable to retain the solid electrolyte particles. If the ratio is excessively high on the other hand, the movement of the lithium ions is blocked, and dispersion resistance of the lithium ions tends to increase.

The composite electrolyte layer may include an inorganic compound containing alumina, instead of the solid electrolyte. For this reason, the composite electrolyte layer can include at least one of the solid electrolyte and the inorganic compound containing alumina. The inorganic compound containing alumina may be, for example, mullite (expressed by the chemical formula from $3Al_2O_3.2SiO_2$ to $2Al_2O_3.SiO_2$, for example), cordierite (expressed by the chemical formula $2MgO.2Al_2O_3.5SiO_2$, for example), ceramic fiber (for example, alumina fiber, alkali earth silicate wool, refractory ceramic fiber, etc.), an alumina composite including a high polymer material, silica alumina (for example, zeolite). The inorganic containing alumina includes alumina itself for the sake of expediency. If the inorganic compound is "alumina", it means an alumina itself. One, or two or more types of these inorganic compounds containing alumina may be used. The inorganic compound may be used along with the above-described solid electrolyte.

Among the inorganic compounds containing alumina, alumina is most preferable. This is because generation of a gas can be further inhibited if the composite electrolyte layer includes alumina.

The ratio of the weight of the inorganic compound containing alumina to the weight of the composite electrolyte layer is in the range of 10% to 90%, for example.

The average particle size of the inorganic compound containing alumina is preferably in the range of 0.1 μm to 10 μm. If the average particle size is less than 0.1 μm, an amount of the solvent contained in the particles of the inorganic compound containing alumina becomes too large; as a result, the decomposition reaction of the nonaqueous electrolyte is excessively stimulated, and the battery performance is deteriorated (deteriorated rate performance and shorter life of the battery, etc.), which is not preferable. If the average particle size of the inorganic compound containing alumina becomes 10 μm or greater, the gaps between the particles increase; as a result, it becomes difficult to make the composite electrolyte layer sufficiently thin and this is not preferable. The average particle size is preferably in the range of 0.1 μm and 5 μm. Within in this range, the decomposition reaction of the nonaqueous electrolyte is appropriately stimulated, and the gaps between the inorganic compound containing alumina and the solid electrolyte particles are proper the particles; as a result, it is possible to maintain the thickness of the composite electrolyte layer thin as appropriate and to maintain a better ion conductivity, and this is more preferable.

The average particle size of the inorganic compound containing alumina can be measured with the above-described method for measuring an average particle size of the solid electrolyte A method of producing the composite electrolyte layer is as follows. The solid electrolyte is mixed with the binder, and the mixture is applied to the electrode. Any coating method can be adopted as long as the mixture can be uniformly applied, and for example a doctor blade method, a spray method, a micro gravure method, a dipping method, or a spin coat method, etc. can be adopted.

After the coating processing, the electrode is dried and pressed so as to adjust the density. The pressing is performed with a roll presser, with a pressure in the range of 0.15 ton/mm to 0.3 ton/mm. When the pressure falls within this range, it is possible to make the density of the composite electrolyte layer fall within the range of 1.0 g/cc to 2.2 g/cc. This is preferable, as the adhesiveness (peel strength) is further increased and an extension rate of the current collector becomes 20% or less.

If the pressing pressure is less than 0.15 ton/mm, the density of the composite electrolyte layer cannot be set at 1.0 g/cc or higher and the peel strength is deteriorated, which is not preferable. If the pressing pressure is greater than 0.3 ton/mm, the density of the composite electrolyte layer becomes too high, and the ion conductivity is deteriorated, which is also not preferable.

The density of the solid electrolyte layer can be measured as follows. The electrode is taken out from the nonaqueous electrolyte secondary battery and subjected to washing, and then the composite electrolyte layer is peeled off the electrode group and the separator. The thickness of the peeled composite electrolyte layer is measured with a constant pressure thickness measurement instrument, etc., and then cut out in a predetermined size that allows an area to be ascertained, and measures the weight of the composite electrolyte layer before and after coating, and the density is then calculated from (weight of the composite electrolyte layer only)/(thickness of the composite electrolyte layer)/(area of the cut-out composite electrolyte layer). The cut-out size may be, for example, 2 cm×2 cm, and the part within 5 mm from the edge of the composite electrolyte layer is not cut out.

The measurement of the density and thickness of the composite electrolyte layer is performed at five points, and of the values obtained from the five points, an average value with the maximum and minimum values excluded is used.

Alternatively, if it is difficult to peel off the composite electrolyte layer, the thickness can be measured by processing a washed electrode with a focused ion beam (FIB) and then observing a section of the processed electrode with an SEM.

(Separator)

As the electrolyte film, a porous film made of a material such as polyethylene (PE), polypropylene (PP, polyethylene terephthalate (PET), cellulose, polyvinylidene fluoride (PVdF), or a synthesized resin-made non-woven fabric, etc. may be used. A porous film coated with an inorganic compound can also be used as the electrolyte film. A porous film is preferably made of polyethylene or polypropylene that melts at a predetermined temperature, so that it breaks a current when melting, thereby improving safety.

(Positive Electrode)

The positive electrode includes a positive electrode current collector and a positive electrode active material layer. The positive electrode active material layer may be formed on one or both sides of the positive electrode current collector. The positive electrode active material layer may contain a positive electrode active material, and optionally a conductive agent and a binder. The positive electrode may contain inorganic compound particles according to the first embodiment.

As the positive electrode active material, lithium nickel manganese oxide having a spinel structure $LiM_xMn_{2-x}O_4$ ($0<x\leq0.5$, M is at least one selected from a group consisting of Ni, Cr, Fe, Cu, Co, Mg, and Mo) is used. At this time, Ni is most preferable as M for its high stability.

The positive electrode material layer may further include other positive electrode active materials. For example, an oxide or a polymer, etc. may be used. The positive electrode active material may include one or two or more types of the oxide or polymer, etc.

As for the other oxides, for example, lithium-inserted manganese dioxide ($MnO_2$), an iron oxide, a copper oxide, a nickel oxide and lithium manganese composite oxide (for example, $Li_xMn_2O_4$ or $Li_xMnO_2$), a lithium nickel composite oxide (for example, $Li_xNiO_2$), a lithium phosphate compound having an olivine structure (for example, $Li_xFePO_4$, $Li_xFe_{1-y}Mn_yPO_4$), iron sulfate ($Fe_2(SO_4)_3$), or a vanadium oxide (for example, $V_2O_5$) may be used. The x and y preferably satisfy $0<x\leq1$, $0\leq y\leq1$.

As a polymer, for example, a conductive polymer material such as polyaniline and polypyrrole, or a disulfide-series polymer material may be used, for example. Sulfur (S) and carbon fluoride can also be used as an active material.

As the positive electrode current collector, it is preferable to use an aluminum foil or an aluminum alloy foil having a purity of 99% or more. The aluminum alloy is preferably an alloy containing an aluminum component and one or more elements selected from the group consisting of iron, magnesium, zinc, manganese, and silicon. For example, an Al—Fe alloy, an Al—Mn-based alloy, and an Al—Mg-based alloy can obtain higher strength than that of aluminum.

Examples of a conductive agent used for enhancing electron conductivity and suppressing contact resistance with the current collector include acetylene black, carbon black, and graphite.

Examples of a binder for binding an active material and the conductive agent include polytetrafluoroethylene (PTFE), polyvinylidene fluoride (PVdF), and fluororubbers.

The blending ratio of the positive electrode active material in the positive electrode active material layer, the conductive agent, and the binder is preferably from 80% by weight to 95% by weight for the positive electrode active material, from 3% by weight to 18% by weight for the conductive agent, and from 2% by weight to 7% by weight for the binder. When the amount of the conductive agent is 3% by weight or more, the effect described above can be exercised. When the amount is 18% by weight or less, decomposition of the nonaqueous electrolyte on the surface of the conductive agent under high temperature storage can be reduced. When the amount of the binder is 2% by weight or more, sufficient electrode strength is obtained, and when it is 7% by weight or less, an insulating portion of the electrode can be decreased.

The positive electrode can be produced by the following method, for example. First, a slurry is prepared by suspending a positive electrode active material, a conductive agent and a binder in a solvent. This slurry is applied onto both surfaces or one surface of the positive electrode current collector. Then, the applied slurry is dried to obtain a laminate of the positive electrode active material layer and the positive electrode current collector. Thereafter, this laminate is pressed. A positive electrode pressing pressure is preferably in a range of 0.15 ton/mm to 0.3 ton/mm. If the positive electrode pressing pressure is in this range, it is preferable because adhesion (peel strength) between the positive electrode active material layer and the positive electrode current collector is enhanced, and, at the same time, the elongation percentage of the positive electrode current collector is 20% or less. In this way, a positive electrode is produced. Alternatively, the positive electrode may be produced by the following method. First, a positive electrode active material, a conductive agent and a binder are mixed to obtain a mixture. The mixture is then formed into pellets. Subsequently, by arranging these pellets on the positive electrode current collector, a positive electrode can be obtained.

(Negative Electrode)

The negative electrode can include a negative electrode current collector and a negative electrode active material layer. The negative electrode active material layer may be formed on both surfaces or one surface of the negative electrode current collector. The negative electrode active material layer may contain a negative electrode active material, and optionally a conductive agent and a binder.

Examples of the negative electrode active material include a carbon material, a graphite material, a lithium alloy material, a metal oxide, and a metal sulfide, and among them, it is preferable to select a negative electrode active material in which an insertion/extraction potential of lithium ions is within a range of 1 V to 3 V based on lithium potential and which comprises one or more titanium-containing oxides selected from lithium titanium oxide, titanium oxide, niobium titanium oxide, and lithium sodium niobium titanium oxide. These negative electrode active materials may be used individually or may be mixed.

Examples of the lithium titanium composite oxide include a spinel structure lithium titanate represented by the general formula $Li_{4+x}Ti_5O_{12}$ (with a range of x of $-1 \leq x \leq 3$). Examples of the titanium oxide include: β-type titanium oxide having a monoclinic structure represented by the general formula $Li_xTiO_2$ ($0 \leq x$) ($TiO_2(B)$ as a precharge structure), titanium oxide having a rutile structure, titanium oxide having an anatase structure ($TiO_2$ as a precharge structure), ramsdellite structure lithium titanate represented by $Li_{2+x}Ti_3O_7$, $Li_{1+x}Ti_2O_4$, $Li_{1.1+x}Ti_{1.8}O_4$, $Li_{1.07+x}Ti_{1.86}O_4$, and $Li_xTiO_2$ (a range of x is $0 \leq x$). Examples of the niobium titanium oxide represented by the general formula $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo and Ta), and $Ti_{1-x}M1_xNb_{2-y}M2_yO_{7-\delta}$ ($0 \leq x < 1$, $0 \leq y < 1$, M1 and M2 includes at least one of Mg, Fe, Ni, Co, W, Ta, or Mo, and the elements M1 and M2 may be the same or different). Examples of the lithium sodium niobium titanium oxide represented by the general formula $Li_{2+v}Na_{2-w}M1_xTi_{6-y-z}Nb_yM2_zO_{14+\delta}$ (M1 includes at least one of Cs, K, Sr, Ba, or Ca, M2 includes at least one of Zr, Sn, V, Ta, Mo, W, Fe, Co, Mn, or Al, $0 \leq v \leq 4$, $0 < w < 2$, $0 \leq x < 2$, $0 < y \leq 6$, $0 \leq z < 3$, $-0.5 \leq \delta \leq 0.5$). The lithium titanate having a spinel structure is preferable among the above-listed for its excellent cycle characteristics and rate characteristics. Other than the above, the negative electrode active material may include a niobium composite oxide, such as $Nb_2O_5$ and $Nb_{12}O_{29}$.

In negative electrode active material particles, it is preferable that the average particle size be 1 μm or less and the specific surface area measured with a BET method using $N_2$ adsorption be in a range of 3 $m^2/g$ to 200 $m^2/g$. Consequently, an affinity with a nonaqueous electrolyte of the negative electrode can be enhanced.

The reason for specifying the specific surface area of the negative electrode within the above range will be described. When the specific surface area is less than 3 $m^2/g$, agglomeration of particles is conspicuous, the affinity between the negative electrode and the nonaqueous electrolyte is lowered, and the interface resistance of the negative electrode is increased. As a result, the output characteristics and charge-and-discharge cycle characteristics are deteriorated. On the other hand, if the specific surface area is more than 50 $m^2/g$, distribution of the nonaqueous electrolyte is biased toward the negative electrode, and this may cause a deficiency of nonaqueous electrolyte at the positive electrode; as a result, the output characteristics and the charge-and-discharge cycle characteristics cannot be improved. A more preferable range of the specific surface area is 5 $m^2/g$ to 50 $m^2/g$. Herein, the specific surface area of the negative electrode means a surface area per 1 g of the negative electrode active material layer (except for the weight of the current collector). The negative active material layer is a porous layer including the negative electrode active material supported on the current collector, the conductive agent, and the binder.

A porosity of the negative electrode (excluding the current collector) is preferably in a range of 20 to 50%. Consequently, it is possible to obtain a high-density negative electrode excellent in affinity with the nonaqueous electrolyte. A more preferable range of the porosity is 25 to 40%.

The negative electrode current collector is formed of a material which is electrochemically stable at a lithium insertion and extraction potential of the negative electrode active material. The negative electrode current collector is preferably formed of copper, nickel, stainless steel or aluminum, or aluminum alloy containing one or more elements selected from Mg, Ti, Zn, Mn, Fe, Cu, and Si. The thickness of the negative electrode current collector is preferably in a range of from 5 μm to 20 μm. The negative electrode current collector having such a thickness can keep the balance between the strength of the negative electrode and lightweight performance.

The negative electrode active material in the form of, for example, particles is contained in the negative electrode. Negative electrode active material particles may be independent primary particles, secondary particles as agglomerates of primary particles, or a mixture of the independent primary particles and the secondary particles. From the viewpoint of increasing the density, it is preferable that the negative electrode active material layer contains primary particles of 5 to 50% by volume. The shape of primary particles is not limited particularly and may be, for example, a spherical shape, an elliptical shape, a flat shape, or a fibrous shape.

As the conductive agent, a carbon material may be used, for example. Examples of a carbon material are acetylene black, carbon black, coke, carbon fibers, graphite, an aluminum powder, and TiO. More preferred are coke obtained by heat treatment at 800° C. to 2000° C. and having an average particle size of 10 μm or less, graphite, a TiO powder, and a carbon fiber having an average fiber diameter of 1 μm or less. The BET specific surface area utilizing $N_2$ adsorption of the carbon material is preferably 10 $m^2/g$ or more.

Examples of the binder include polytetrafluoroethylene (PTFE), polyvinylidene fluoride (PVdF), fluorine rubbers, styrene butadiene rubber, and core-shell binders.

Concerning the blending ratio of the negative active material, the conductive agent, and the binder in the negative electrode, it is preferable for the negative electrode active material to be used in an amount of 80 to 95% by weight, for the conductive agent to be used in an amount of 3 to 18% by weight, and for the binder to be used in an amount of 2 to 7% by weight. If the compounding ratio of the conductive agent is less than 3% by weight, the current collecting performance of the negative electrode active material layer may be deteriorated, and the large current characteristics of the nonaqueous electrolyte secondary battery may be deteriorated. If the compounding ratio of the binder is less than 2% by weight, the integrity between the negative electrode active material layer and the negative electrode current collector may be deteriorated, and the cycle characteristics may be deteriorated. On the other hand, in order to achieve a larger capacity, it is preferable that each of the conductive agent and the binder be 10% by volume or less.

The negative electrode can be produced by the following method, for example. First, slurry is prepared by suspending the negative active material, the conductive agent, and the binder in a suitable solvent. Next, the slurry is applied to one or both surfaces of the negative electrode current collector. The obtained coating film on the negative electrode current collector is dried to form a negative electrode active material layer. Thereafter, the negative electrode current collector and the negative electrode active material layer formed thereon are subjected to pressing. As the negative electrode active material layer, the negative electrode active material, the conductive agent, and the binder, together shaped into a pellet form, may be used.

Thus, the electrode group according to the first embodiment includes a positive electrode that includes a lithium composite oxide $LiM_xMn_{2-x}O_4$ (0<x≤0.5, M is at least one selected from a group consisting of Ni, Cr, Fe, Cu, Co, Mg, and Mo) as the positive electrode active material, a negative electrode that includes the negative electrode active material, and a composite electrolyte layer including at least one of the solid electrolyte and the inorganic compound containing alumina, and the separator. The composite electrolyte layer and the separator are arranged between the positive electrode and the negative electrode. The density of the composite electrolyte layer is in the range of 1.0 g/cc and 2.2 g/cc.

With the electrode group having such a configuration, it is possible to provide a high battery-voltage nonaqueous electrolyte secondary battery that can suppress gas generation and has excellent rate characteristics.

Second Embodiment

The nonaqueous electrolyte secondary battery according to the second embodiment includes the electrode group according to the first embodiment, a nonaqueous electrolyte, and a container member. Each of the members of the nonaqueous electrolyte secondary battery according to the second embodiment will be described below.

(Electrode Group)

Since the electrode group described in the first embodiment is used in the second embodiment, the description of the electrode group is omitted.

(Nonaqueous Electrolyte)

The nonaqueous electrolyte includes an organic solvent and an electrolyte salt. A preferable organic solvent is one into which the composite electrolyte layer is difficult to melt and which allows the composite electrolyte layer to exist in a stable state.

As a nonaqueous electrolyte, a liquid nonaqueous electrolyte or a gel nonaqueous electrolyte can be used. The liquid nonaqueous electrolyte is prepared by dissolving the electrolyte salt into an organic solvent. The concentration of the electrolyte salt preferably falls under the range of 0.5 mol/l to 2.5 mol/l. The gel nonaqueous electrolyte is prepared by making a composite from the liquid nonaqueous electrolyte and a high polymer material. The liquid electrolyte is preferable because its Li conductivity is higher than that of the gel nonaqueous electrolyte, and excellent input-output characteristics can be thereby obtained.

Examples of the organic solvent include: a cyclic carbonate, such as N-methyl-2-pyrrolidone (NMP), propylene carbonate (PC), ethylene carbonate (EC), or vinylene carbonate; a chain carbonate, such as diethyl carbonate (DEC), dimethyl carbonate (DMC), or methyl ethyl carbonate (MEC); a cyclic ether, such as tetrahydrofuran (THF), 2-methyltetrahydrofuran (2MeTHF), or dioxolane (DOX); a chain ether, such as dimethoxyethane (DME), and diethoxyethane (DEE); γ-butyrolactone (GBL), acetonitryl (AN), and sulfolane (SL). These organic solvents may be used individually or mixed.

Preferably, the electrolyte salt includes a lithium salt, such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethane-sulfonate ($LiCF_3SO_3$), and lithium bis(trifluoromethylsulphonyl)imide [$LiN(CF_3SO_2)_2$], etc., or any mixtures thereof. The organic electrolyte may contain other electrolyte salts.

(Container Member)

As a container member, either a bag-like container made of a laminate film or a metal container may be used.

The shape of the container member may be, for example, a flat type, a rectangular type, a cylindrical type, a coin type, a button type, a sheet type, and a lamination shape, etc. Of course, the container member may be, for example, a container member for a small battery mounted on a portable electronic device or the like, or a container member for a large battery mounted on a two-wheel or four-wheel automobile or the like.

As the laminate film, for example, a multilayer film in which a metal layer is interposed between resin films may be used. As the metal layer, aluminum foil or aluminum alloy foil is preferable for weight reduction. As the resin film, a high polymer material such as polypropylene (PP), polyethylene (PE), nylon, polyethylene terephthalate (PET), or the like may be used. The laminate film can be formed into a shape of the container member by thermal-melting sealing. The thickness of the laminate film is preferably 0.2 mm or less. The laminate film used as a container member is not limited to a lamination of two resin films and a metal layer interposed therebetween, and a multi-layered film consisting of metal layers and resin layers coating the metal layers can be used.

The container made of metal can be formed from aluminum or aluminum alloy. The aluminum alloy preferably includes one or more of elements such as magnesium, zinc, and silicon. On the other hand, the content of transition metals such as iron, copper, nickel, and chromium is preferably set to 100 ppm or less. Accordingly, long-term reliability in a high-temperature environment and heat dissipation properties can be improved dramatically. The container made of metal desirably has a thickness of 0.5 mm or less, and the container more desirably has a thickness of 0.2 mm or less.

(Positive Electrode Terminal)

The positive electrode terminal is formed from a material having an electrically stable potential in the range of 3.0 to 5.5 V vs. $Li/Li^+$, and at the same time, having electrical conductivity. The positive electrode terminal 7 is preferably formed from aluminum or an aluminum alloy. The aluminum alloy may include one or more of elements such as Mg, Ti, Zn, Mn, Fe, Cu, and Si. The positive electrode terminal is preferably formed from the same material as that of the positive electrode current collector, to reduce the contact resistance with the positive electrode current collector.

(Negative Electrode Terminal)

The negative electrode terminal is formed from a material having an electrically stable potential in the range of 1.0 V to 3.0 V vs. $Li/Li^+$, and at the same time, having electrical conductivity. The negative electrode terminal is preferably formed from aluminum or an aluminum alloy. The aluminum alloy may include elements such as Mg, Ti, Zn, Mn, Fe, Cu, and Si. The negative electrode terminal is preferably formed from the same material as that of the negative electrode current collector, to reduce the contact resistance with the negative electrode current collector.

Hereinafter, the nonaqueous electrolyte secondary battery according to the second embodiment will be described in more detail with reference to FIGS. 2 and 3. However, the nonaqueous electrolyte secondary battery according to the second embodiment is not limited to the electrode group, etc. that will be described below. FIG. 2 is a cross-sectional view of the flat-type nonaqueous electrolyte secondary battery 10 according to the first embodiment, and FIG. 3 is an enlarged cross-sectional view of portion A shown in FIG. 2.

The flat wound electrode group 1 is stored in a bag-like container member 2 made of a laminate film with two sheets of resin films having a metal layer being interposed therebetween. The flat wound electrode group 1 is formed through winding a lamination obtained by stacking the negative electrode 3, the composite electrolyte layer 8, the separator 4, the positive electrode 5, and the separator 4 in this order into a spiral, and pressing it into a shape. The outermost negative electrode 3 has a structure in which a negative electrode active material layer 3b including a negative electrode active material is formed on a single surface on the inner surface of the negative electrode current collector 3a as shown in FIG. 3, and the other negative electrodes 3 have a structure in which the negative electrode active material layers 3b are formed on both surfaces of the negative electrode current collector 3b. The positive electrode 5 is configured through forming the positive electrode active material layer 5b on both surfaces of the positive electrode current collector 5a.

In the proximity of the outer periphery of the wound electrode group 1, the negative electrode terminal 6 is connected to the negative electrode current collector 3a of the outermost negative electrode 3, and the positive electrode terminal 7 is connected to the positive electrode current collector 5a of the inner positive electrode 5. The negative electrode terminal 6 and the positive electrode terminal 7 externally extend from the opening of the bag-like container member 2. For example, the liquid nonaqueous electrolyte is injected from the opening of the bag-like container member 2. The wound electrode group 1 and the liquid nonaqueous electrolyte are completely sealed by heat-sealing the opening of the bag-like container member 2 sandwiched with the negative electrode terminal 6 and the positive electrode terminal 7.

Figure 5:
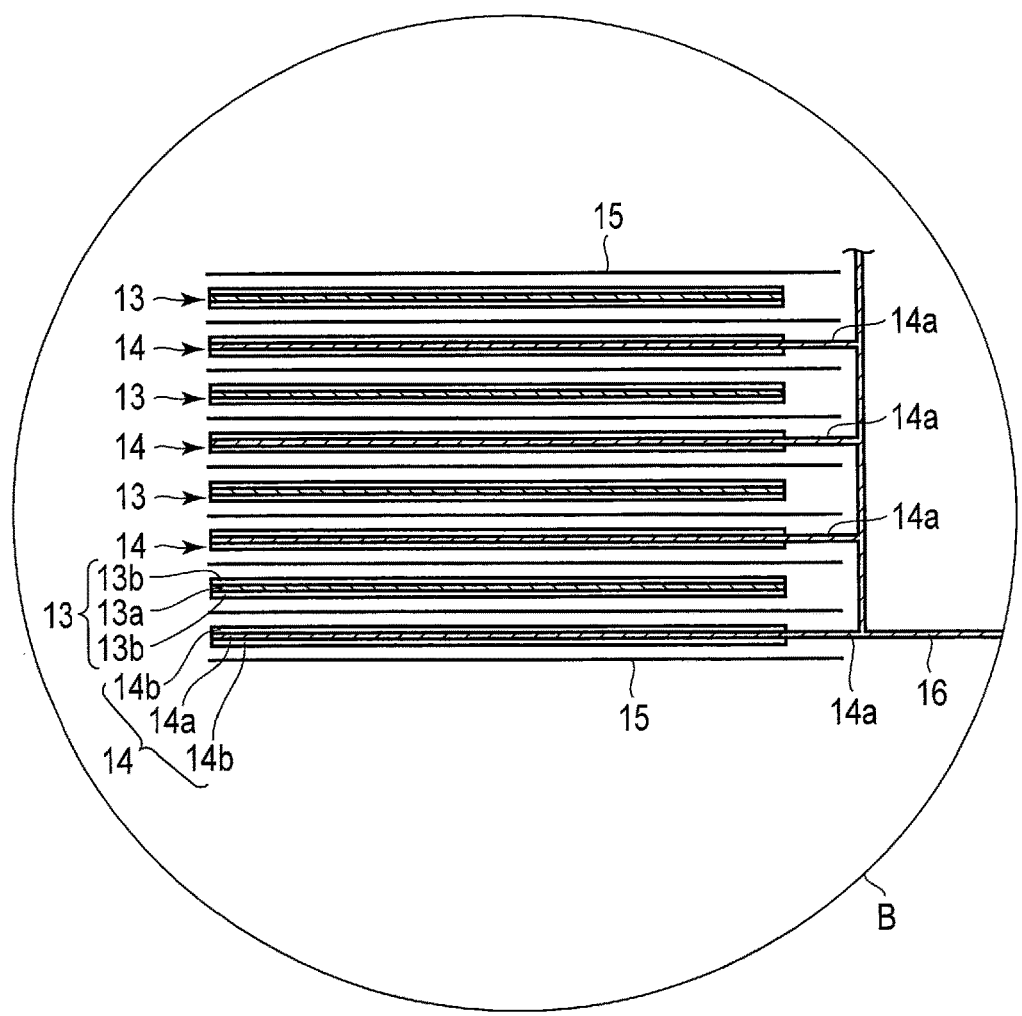
FIG. 5 is an enlarged cross-sectional schematic view of part B shown in FIG. 4.

The nonaqueous electrolyte secondary battery according to the second embodiment is not limited to the above-described structure shown in FIGS. 2 and 3, and may have the structure shown in FIGS. 4 and 5, for example. FIG. 4 is a partial broken perspective view showing another example of the flat-type nonaqueous electrolyte secondary battery according to the second embodiment, and FIG. 5 is an enlarged cross-sectional drawing of portion B shown in FIG. 4. The composite electrolyte layer is omitted in FIG. 5 to avoid making the drawing complicated.

The lamination-type electrode group 11 is stored in the container member 12 made of a laminate film consisting of two resin films and a metal layer interposed therebetween. The lamination-type electrode group 11 has a structure in which the positive electrode 13 and the negative electrode 14 are alternately stacked with the composite electrolyte layer and the separator 15 being interposed therebetween, as shown in FIG. 5. There are multiple layers of the positive electrode 13, and each has a current collector 13a and a positive electrode active material layer 13b supported on both surfaces of the current collector 13a. There are multiple layers of the negative electrodes 14, and each has a current collector 14a and a negative electrode active material layer 14b supported on both surfaces of the current collector 14a. One side of the current collector 14a of each negative electrode 14 projects from the positive electrode 13. The projecting current collector 14a is electrically connected to a belt-like negative electrode terminal 16. The tip of the belt-like negative electrode terminal 16 is externally drawn out from the container member 12. Although not shown, the current collector 13a of the positive electrode 13 projects from the negative electrode 14 on the side opposite to that from which the projecting side of the current collector 14a projects. The current collector 13a projecting from the negative electrode 14 is electrically connected to a belt-like positive electrode terminal 17. The tip of the belt-like negative electrode terminal 16 is located opposite to the negative electrode terminal 17, and externally drawn out from the side of the container member 12.

The nonaqueous electrolyte secondary battery according to the foregoing second embodiment includes the electrode group according to the first embodiment and the nonaqueous. With such a nonaqueous electrolyte secondary battery, it is possible to maintain the input and output characteristic of a cell, to suppress an electrolyte decomposition reaction, and to suppress generation of a gas; therefore, a nonaqueous electrolyte secondary battery having excellent rate performance can be provided.

Third Embodiment

The battery pack according to the third embodiment has one or more of the nonaqueous electrolyte secondary batteries (unit cells) that are included in the foregoing second embodiment. If the battery pack has a plurality of unit cells, the unit cells are electrically connected in series, in parallel, or combination in series and parallel.

Such a battery pack will be described in detail with reference to FIGS. 6 and 7. A flat battery shown in FIG. 2 can be used as the unit cell.

Plurality of unit cells 21 are stacked such that the externally projected negative electrode terminals 6 and positive electrode terminals 7 are aligned in the same direction and fastened by an adhesive tape 22 to constitute a battery module 23. As shown in FIG. 7, these single-batteries 21 are electrically connected in series to each other.

A printed wiring board 24 is arranged opposite to the side surface of the unit cells 21, from which the negative electrode terminal 6 and the positive electrode terminal 7 project. As shown in FIG. 7, a thermistor 25, a protective circuit 26, and a conducting terminal 27 that conducts electricity to external devices are mounted on the printed wiring board 24. Additionally, an electric insulating plate (not shown) is mounted on the surface of the printed wiring board 24 opposite to the battery module 23 to avoid unnecessary connection to wires of the battery module 23.

A positive electrode lead 28 is connected to the positive electrode terminal 7 positioned in the lowermost layer of the battery module 23. One end of the positive electrode lead 28 is inserted into a positive electrode connector 29 of the printed wiring board 24, and thereby electrically connecting the positive electrode lead 28 to the printed wiring board 24. A negative electrode lead 30 is connected to the negative electrode terminal 6 positioned in the uppermost layer of the battery module 23. One end of the negative electrode lead 30 is inserted into a negative electrode connector 31 of the printed wiring board 24, thereby electrically connecting the negative electrode lead 30 to the printed wiring board 24. The connectors 29 and 31 are connected to the protective circuit 26 via wires 32 and 33 formed on the printed wiring board 24.

Figure 8:
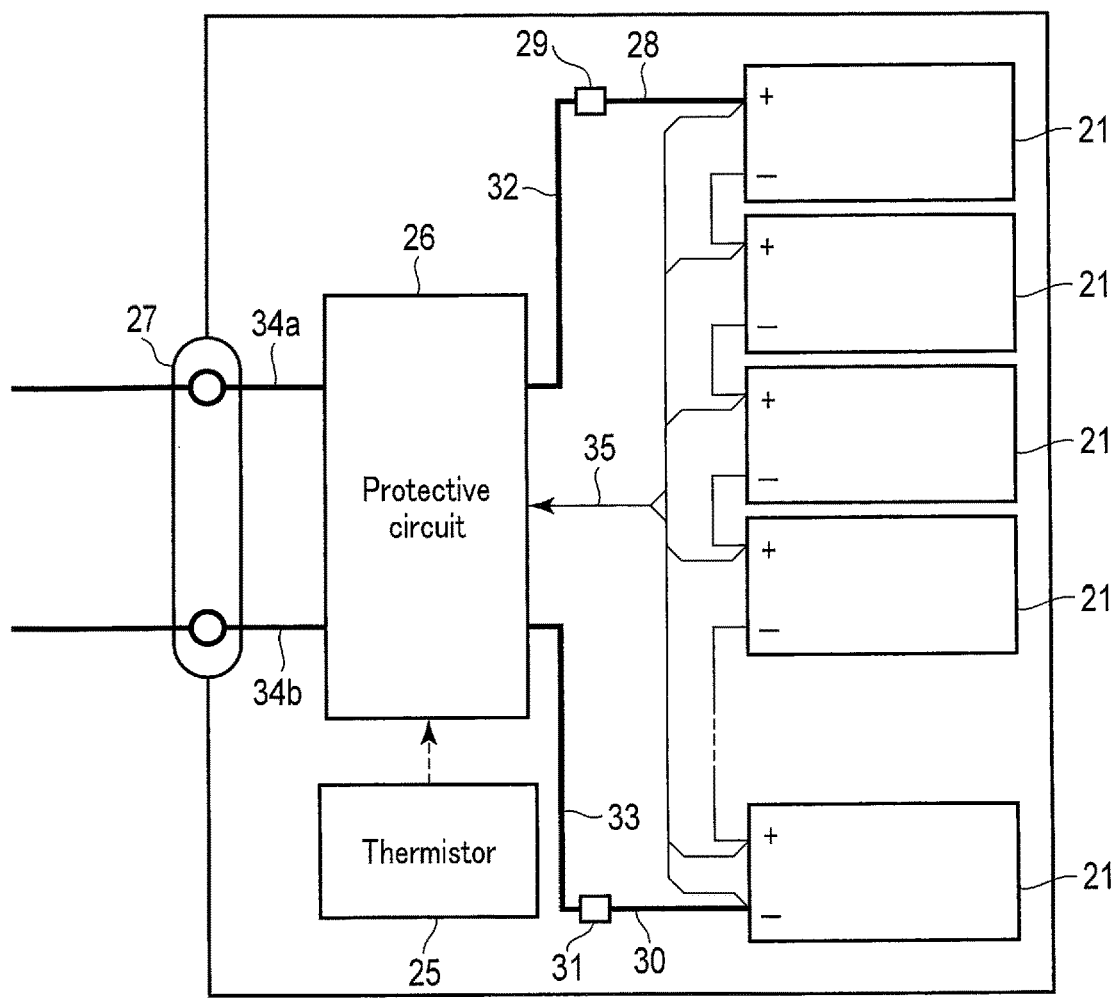
FIG. 8 is a block diagram showing an electric circuit of the battery pack shown in FIG. 7.

With reference to FIG. 8, which is a block diagram showing an electric circuit of the battery pack of FIG. 7, the thermistor 25 is used to detect the temperature of the unit cell 21, and the thermistor 25 detects the temperature of the unit cell 21 and sends a detection signal to a protective circuit 26. The protective circuit 26 can disconnect a positive-side wire 34a and a negative-side wire 34b between the protective circuit 26 and the conducting terminal 27 under a predetermined condition. The predetermined condition is, for example, when the temperature detected by the thermistor 25 rises to a predetermined temperature or higher. Also, the predetermined condition is when an over-charge, an over-discharge, or an over-current of the unit cell 21 is detected. An over-charge or the like is detected for an individual unit cell 21 or all of the unit cells 21 as a whole. When an individual unit cell 21 is detected, the battery voltage may be detected, or the positive electrode potential or negative electrode potential may be detected. In the latter case, a lithium electrode used as a reference electrode is inserted into each of the individual unit cells 21. In the case of FIGS. 6 and 7, a wire 35 for voltage detection is connected to each of the unit cells 21. A detection signal is sent to the protective circuit 26 through these wires 35.

A protective sheet 36 made of rubber or resin is arranged on each of three side surfaces of the battery module 23 excluding the side surface from which the positive electrode terminal 7 and the negative electrode terminal 6 project.

The battery module 23 is housed in a housing container 37 together with each of the protective sheets 36 and the printed wiring board 24. That is, the protective sheet 36 is arranged on each of both inner side surfaces along a long-side direction and an inner side surface along a short-side direction of the housing container 37. In addition, the printed wiring board 24 is arranged on an inner side surface opposite to the protective sheet 36 that is arranged along the short-side direction. The battery module 23 is positioned in a space surrounded by the protective sheets 36 and the printed wiring board 24. A cover 38 is mounted on the top surface of the housing container 37.

Instead of the adhesive tape 22, a heat-shrinkage tape may be used to fix the battery module 23. In this case, the protective sheet is arranged on both side surfaces of the battery module, and after the heat-shrinkage tube is wound around the battery module and protective sheets, the heat-shrinkage tube is allowed to heat-shrink to bind the battery module together.

Figure 6:
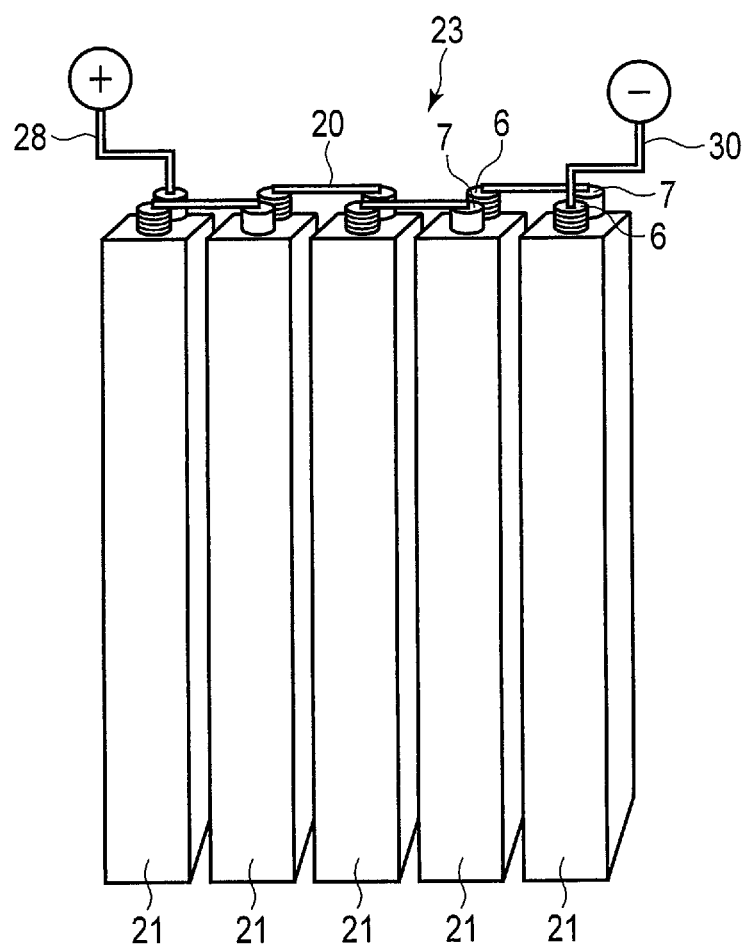
FIG. 6 is a schematic perspective view of an example of a battery module according to a third embodiment.

While FIGS. 6 and 7 show an embodiment in which the unit cells 21 are connected in series, the unit cells may be connected in parallel to increase the battery capacity.

In addition, assembled battery packs may further be connected in series and/or in parallel.

The battery module 23 shown in FIG. 6 and the battery pack 200 shown in FIG. 7 include a plurality of unit cells 21; however, the battery pack of the third embodiment may include only one unit cell 21.

The embodiment of the battery pack can vary as appropriate depending on its use. The battery pack according to the present embodiment is suitably used for a use that requires excellent cycle performance when a large current is taken out. Specifically, such a battery pack can be used as a power supply for a digital camera.

The battery pack according to the present embodiment includes a nonaqueous electrolyte battery according to the second embodiment, and therefore can exhibit excellent rate characteristics.

Fourth Embodiment

According to a fourth embodiment, a vehicle is provided. The vehicle includes the battery pack according to the third embodiment.

In the vehicle according to the fourth embodiment, the battery pack is configured, for example, to recover regenerative energy from motive force of the vehicle. The vehicle according to the fourth embodiment may include a mechanism for converting kinetic energy of the vehicle into regenerative energy.

Examples of the vehicle according to the fourth embodiment include two-wheeled to four-wheeled hybrid electric automobiles, two-wheeled to four-wheeled electric automobiles, power-assisted bicycles, and railway cars.

In the vehicle according to the fourth embodiment, the installing position of the battery pack is not particularly limited. For example, when installing the battery pack on the vehicle, the battery pack may be installed in the engine compartment of the vehicle, in rear parts of the vehicle, or under seats.

An example of the vehicle according to the fourth embodiment is explained below, with reference to the drawings.

Figure 9:
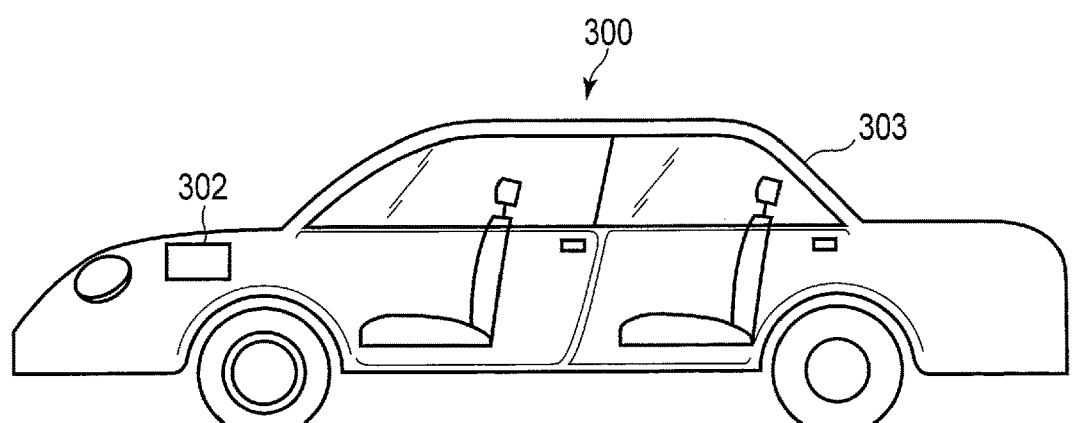
FIG. 9 is a cross-sectional view schematically showing a vehicle of an example according to a fourth embodiment.

FIG. 9 is a cross-sectional view schematically showing an example of a vehicle according to the fourth embodiment.

A vehicle 300, shown in FIG. 9 includes a vehicle body 301 and a battery pack 302. The battery pack 302 may be the battery pack according to the third embodiment.

The vehicle 300, shown in FIG. 9, is a four-wheeled automobile. As the vehicle 300, for example, a two-wheeled to four-wheeled hybrid electric automobile, a two-wheeled to four-wheeled electric automobile, a power-assisted bicycle, or railway car may be used.

The vehicle 300 may include plural battery packs 302. In that case, the battery packs 302 may be connected to each other in series or in parallel. The connection may be a combination of the connection in series and the connection in parallel.

The battery pack 302 is installed in an engine compartment located at the front of the vehicle body 301. The position at which the battery pack 302 is installed is not particularly limited. The battery pack 302 may be installed in rear sections of the vehicle body 301, or under a seat. The battery pack 302 may be used as a power source of the vehicle 300. The battery pack 302 can also recover regenerative energy of motive force of the vehicle 300.

Figure 10:
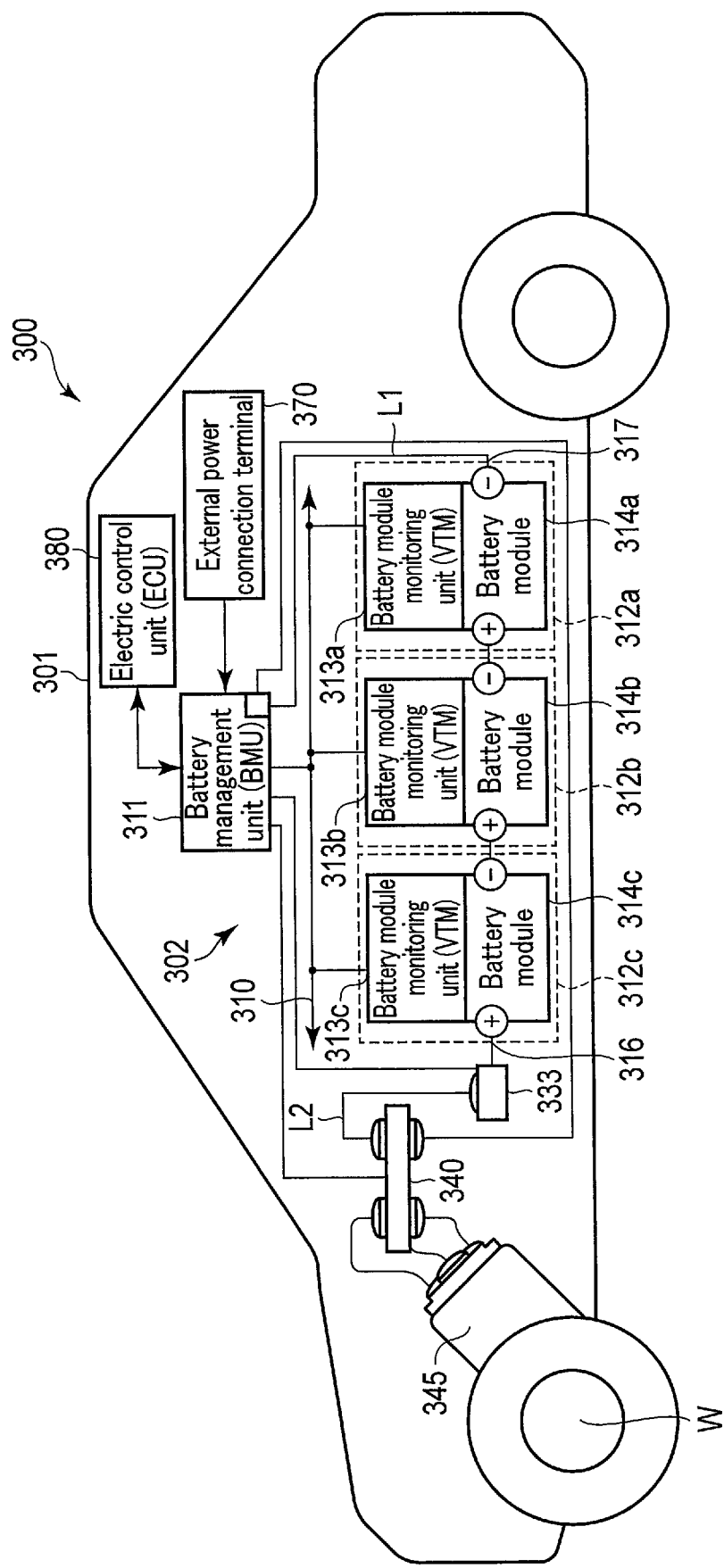
FIG. 10 is a cross-sectional view schematically showing a vehicle of an example according to the fourth embodiment.

Next, with reference to FIG. 10, an aspect of operation of the vehicle according to the fourth embodiment is explained.

FIG. 10 is a view schematically showing another example of the vehicle according to the fourth embodiment. A vehicle 300, shown in FIG. 10, is an electric automobile.

The vehicle 300, shown in FIG. 10, includes a vehicle body 301, a vehicle power source 302, a vehicle ECU (electric control unit) 380, which is a master controller of the vehicle power source 302, an external terminal (an external power connection terminal) 370, an inverter 340, and a drive motor 345.

The vehicle 300 includes the vehicle power source 302, for example, in an engine compartment, in the rear sections of the automobile body, or under a seat. In FIG. 10, the position of the secondary battery installed in the vehicle 300 is schematically shown.

The vehicle power source 302 includes plural (for example, three) battery packs 312a, 312b and 312c, BMU (a battery management unit) 311, and a communication bus 310.

The three battery packs 312a, 312b and 312c are electrically connected in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack 312.

Each of the battery modules 314a to 314c includes plural single-batteries connected to each other in series. At least one of the plural single-batteries is the secondary battery according to the second embodiment. The battery modules 314a to 314c each perform charging and discharging through a positive electrode terminal 316 and a negative electrode terminal 317.

In order to collect information concerning security of the vehicle power source 302, the battery management unit 311 performs communication with the battery module monitoring units 313a to 313c and collects information such as voltages or temperatures of the single-batteries included in the battery modules 314a to 314c included in the vehicle power source 302.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single-battery in the battery modules 314a to 314c based on commands communicated from the battery management unit 311. It is possible, however, to measure the temperatures only at several points per battery module, and the temperatures of all of the single-batteries need not be measured.

The power source for vehicle 302 may also have an electromagnetic contactor (for example, a switch unit 333 shown in FIG. 10) for switching connection between the positive electrode terminal 316 and the negative electrode terminal 317. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal provided to a coil disposed near the switch elements.

The inverter 340 converts an inputted direct current voltage to a three-phase alternate current (AC) high voltage for driving a motor. Three phase output terminal(s) of the inverter 340 is (are) connected to each three-phase input terminal of the drive motor 345. The inverter 340 controls an output voltage based on control signals from the battery management unit 311 or the vehicle ECU 380, which controls the entire operation of the vehicle.

The drive motor 345 is rotated by electric power supplied from the inverter 340. The rotation is transferred to an axle and driving wheels W via a differential gear unit, for example.

The vehicle 300 also includes a regenerative brake mechanism, though not shown. The regenerative brake mechanism rotates the drive motor 345 when the vehicle 300 is braked, and converts kinetic energy to regenerative energy, as electric energy. The regenerative energy, recovered in the regenerative brake mechanism, is inputted into the inverter 340 and converted to direct current. The direct current is inputted into the vehicle power source 302.

One terminal of a connecting line L1 is connected via a current detector (not shown) in the battery management unit 311 to the negative electrode terminal 317 of the vehicle power source 302. The other terminal of the connecting line L1 is connected to a negative electrode input terminal of the inverter 340.

One terminal of a connecting line L2 is connected through the switch unit 333 to the positive electrode terminal 316 of the vehicle power source 302. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 302, such as a remaining capacity of the vehicle power source 302, are transferred between the battery management unit 311 and the vehicle ECU 380 via communication lines.

A vehicle according to the fourth embodiment includes a battery pack according to the third embodiment. In other words, the vehicle according to the fourth embodiment includes a battery pack having excellent cycle performance. The vehicle according to the fourth embodiment has excellent life span performance. The battery pack has excellent rate characteristics. Thus, a vehicle having a high reliability can be provided.

EXAMPLES

Example 1

A nonaqueous electrolyte secondary battery was produced by the following procedures.

<Production of Positive Electrode>

Slurry was prepared by mixing 100 parts by weight of spinel-type lithium nickel compound oxide ($LiNi_{0.5}Mn_{1.5}O_4$) powder as the positive electrode active material, 5 parts by weight of acetylene black as the conductive agent, and 2 parts by weight of polyvinylidene fluoride (PVdF) as the binder into N-methylpyrrolidone (NMP). The slurry was applied to both surfaces of the current collector made of aluminum foil having a thickness of 12 μm, and pressed and dried inside a constant temperature oven at 120° C., thereby obtaining the positive electrode.

<Production of Negative Electrode>

Slurry was prepared by mixing 100 parts by weight of lithium titanate powder as the negative electrode active material, 4 parts by weight of acetylene black as the conductive agent, and 2 parts by weight of polyvinylidene fluoride (PVdF) as the binder into N-methylpyrrolidone (NMP). This slurry was applied to both surfaces of the negative electrode current collector made of aluminum foil having a thickness of 12 μm, and pressed and dried inside a constant temperature oven at 120° C.

<Production of Composite Electrolyte Layer>

Slurry was prepared by mixing LATP ($Li_{1.4}Al_{0.4}Ti_{1.6}(PO_4)_3$) particles having an average particle size of 1 μm with PVdF at the ratio of 9:1, and diluting the mixture with NMP, and the slurry was applied to the positive electrode so as to produce the composite electrolyte layer on the positive electrode. As the separator, an unwoven fabric made of polyethylene having a thickness of 25 μm was used.

<Production of Electrode Group>

A laminated structure was obtained by laminating the positive electrode coated with the composite electrolyte layer, the separator, the negative electrode, and the separator in this order. Next, this laminated structure was wound into a spiral. This was heated and pressed at 80° C. to produce a flat wound electrode group. The obtained electrode group was stored in a pack made of a laminate film having a three-layer structure constituting a nylon layer, an aluminum layer, and a polyethylene layer, and having a thickness of 0.1 mm, and then dried in a vacuum atmosphere at 120° C. for 16 hours.

<Preparation of Nonaqueous Electrolyte>

A nonaqueous electrolyte was obtained by dissolving 1 mol/L of $LiPF_6$ as an electrolyte into a mixture solvent of propylene carbonate (PC) and diethyl carbonate (DEC) (volume ratio 1:2). The preparation of the electrolyte was performed inside an argon box.

After injection of the nonaqueous electrolyte into the laminate film pack storing the electrode group, the pack was completely sealed by heat sealing. The nonaqueous electrolyte secondary battery was thereby obtained.

<Performance Evaluation>

The battery was tested under conditions of 25° C. In the charging and discharging, first the battery was charged at 100 mA up to 3.5 V then discharged at 20 mA up to 2.5 V, and the capacity of the battery was then checked, and thereafter, the battery was discharged at a discharging current of 1 A, and then the capacity of the battery was checked. Thereafter, the charging and discharging at 100 mA was repeated for 200 cycles, and an amount of a gas generated and a discharging capacity retention ratio were compared. The results are shown in Table 2 below.

<Measurement of Density and Thickness of Composite Electrolyte Layer>

The battery that was subjected to the performance evaluation was decomposed, and the density and thickness of the composite electrolyte layer were measured. First, the composite electrolyte layer was peeled off the battery, and a sample piece of 2 cm×2 cm was cut out. The thickness of this sample piece was 21 μm. The density of the composite electrolyte layer was 1.5 g/cc.

In the following, for Examples 2 through 30 and Comparative Examples 1 through 7, Tables 1 through 6 show the type and the average particle size of the solid electrolyte or the inorganic compound containing alumina, the location of the composite electrolyte layer, the density of the composite electrolyte layer, and the thickness of the composite electrolyte layer, the amount of gas generated, and the discharge capacity maintenance rate.

Example 2

A nonaqueous electrolyte secondary battery was produced in the same manner as described in Example 1, except that the composite electrolyte layer was formed on the negative electrode and the thickness was 23 μm, and the evaluation was conducted.

Example 3

A nonaqueous electrolyte secondary battery was produced in the same manner as described in Example 1, except that the composite electrolyte layer was formed on the separator and the thickness was 22 μm, and the evaluation was conducted.

Example 4

A nonaqueous electrolyte secondary battery was produced in the same manner as described in Example 1, except that the composite electrolyte layer was formed on both of the negative electrode and the positive electrode, and the thickness was 20 μm on the negative electrode side and 21 μm on the positive electrode side, and the evaluation was conducted.

Example 5

A nonaqueous electrolyte secondary battery was produced in the same manner as described in Example 2, except that the composite electrolyte layer was formed with a thickness of 2 μm, and the evaluation was conducted.

Example 6

An electrode was produced in the same manner as described in Example 2, except that the solid electrolyte was changed to $Li_7La_3Zr_2O_{12}$ and the composite electrolyte layer was formed with a thickness of 5 μm, and a nonaqueous electrolyte secondary battery was produced using the thereby-produced electrode, and the evaluation was conducted.

Example 7

An electrode was produced in the same manner as described in Example 2, except that the solid electrolyte was changed to $Li_{0.5}La_{0.5}TiO_3$ having an average particle size of 2 μm, and the composite electrolyte layer was formed with a thickness of 4 μm, and a nonaqueous electrolyte secondary battery was produced using the thereby-produced electrode, and the evaluation was conducted.

Example 8

An electrode was produced in the same manner as described in Example 2 except that the solid electrolyte was changed to $Li_{3.6}Si_{0.6}PO_4$, and the composite electrolyte layer was formed with a thickness of 10 μm, and a nonaqueous electrolyte secondary battery was produced using the thereby-produced electrode, and the evaluation was conducted.

Example 9

An electrode was produced in the same manner as described in Example 2 except that the solid electrolyte was changed to LIPON ($Li_{2.9}PO_{3.3}N_{0.46}$) having an average particle size of 3 μm, and the composite electrolyte layer was formed with a thickness of 11 μm, and a nonaqueous electrolyte secondary battery was produced using the thereby-produced electrode, and the evaluation was conducted.

Example 10

An electrode was produced in the same manner as described in Example 1 except that the composite electrolyte layer was formed with a density of 1.0 g/cc and a thickness of 10 μm, and a nonaqueous electrolyte secondary battery was produced using the thereby-produced electrode, and the evaluation was conducted.

Example 11

An electrode was produced in the same manner as described in Example 2 except that the composite electrolyte layer was formed with a density of 1.0 g/cc and a thickness of 15 μm, and a nonaqueous electrolyte secondary battery was produced using the thereby-produced electrode, and the evaluation was conducted.

Example 12

An electrode was produced in the same manner as described in Example 1 except that the composite electrolyte layer was formed with a density of 2.1 g/cc and a thickness of 22 μm, and a nonaqueous electrolyte secondary battery was produced using the thereby-produced electrode, and the evaluation was conducted.

Example 13

An electrode was produced in the same manner as described in Example 2 except that the composite electrolyte layer was formed with a density of 2.2 g/cc and a thickness of 2 μm, and a nonaqueous electrolyte secondary battery was produced using the thereby-produced electrode, and the evaluation was conducted.

Example 14

An electrode was produced in the same manner as described in Example 6 except that the composite electrolyte layer was formed with a density of 1.2 g/cc and a thickness of 3 μm, and a nonaqueous electrolyte secondary battery was produced using the thereby-produced electrode, and the evaluation was conducted.

Example 15

An electrode was produced in the same manner as described in Example 6 except that the composite electrolyte layer was formed with a density of 2.2 g/cc and a thickness of 2 μm, and a nonaqueous electrolyte secondary battery was produced using the thereby-produced electrode, and the evaluation was conducted.

Example 16

An electrode was produced in the same manner as described in Example 1 except that the composite electrolyte layer was formed with a thickness of 0.2 μm, and a nonaqueous electrolyte secondary battery was produced using the thereby-produced electrode, and the evaluation was conducted.

Example 17

A nonaqueous electrolyte secondary battery was produced in the same manner as described in Example 1, except that the composite electrolyte layer was formed with a thickness of 76 μm, and the evaluation was conducted.

Example 18

An electrode was produced in the same manner as described in Example 1 except that the composite electrolyte layer was formed with a thickness of 97 μm, and a nonaqueous electrolyte secondary battery was produced using the thereby-produced electrode, and the evaluation was conducted.

Example 19

An electrode was produced in the same manner as described in Example 1 except that the solid electrolyte has an average particle size of 9.8 μm, and a nonaqueous electrolyte secondary battery was produced using the thereby-produced electrode, and the evaluation was conducted.

Example 20

An electrode was produced in the same manner as described in Example 1 except that the solid electrolyte has an average particle size of 0.1 μm, and a nonaqueous electrolyte secondary battery was produced using the thereby-produced electrode, and the evaluation was conducted.

Example 21

An electrode was produced in the same manner as described in Example 1 except that the solid electrolyte has an average particle size of 5.5 μm, and a nonaqueous electrolyte secondary battery was produced using the thereby-produced electrode, and the evaluation was conducted.

Example 22

An electrode was produced in the same manner as described in Example 1 except that the solid electrolyte has an average particle size of 7.8 μm, and a nonaqueous electrolyte secondary battery was produced using the thereby-produced electrode, and the evaluation was conducted.

Example 23

An electrode was produced in the same manner as described in Example 1 except that alumina ($Al_2O_3$) having an average particle size of 1 μm was used as the inorganic compound containing alumina instead of the solid electrolyte, and that the electrode was produced so as to have a density of 1.5 g/cc and a thickness of 10 μm, and a nonaqueous electrolyte secondary battery was produced using the thereby-produced electrode, and the evaluation was conducted.

Example 24

An electrode was produced in the same manner as described in Example 1 except that alumina ($Al_2O_3$) having an average particle size of 0.2 μm was used as the inorganic compound containing alumina instead of the solid electrolyte, and that the electrode was produced so as to have a density of 1.5 g/cc and a thickness of 10 μm, and a nonaqueous electrolyte secondary battery was produced using the thereby-produced electrode, and the evaluation was conducted.

Example 25

An electrode was produced in the same manner as described in Example 1 except that alumina ($Al_2O_3$) having an average particle size of 8 μm was used as the inorganic compound containing alumina instead of the solid electrolyte, and that the electrode was produced so as to have a density of 1.5 g/cc and a thickness of 15 μm, and a nonaqueous electrolyte secondary battery was produced using the thereby-produced electrode, and the evaluation was conducted.

Example 26

An electrode was produced in the same manner as described in Example 1 except that a mixture obtained by mixing alumina ($Al_2O_3$) having an average particle size of 1 μm as the inorganic compound containing alumina with LATP having an average particle size of 1 μm at the ratio of 1:1 was used instead of the solid electrolyte, and that the electrode was produced so as to have a density of 1.5 g/cc and a thickness of 10 μm, and a nonaqueous electrolyte secondary battery was produced using the thereby-produced electrode, and the evaluation was conducted.

Example 27

An electrode was produced in the same manner as described in Example 1 except that alumina ($Al_2O_3$) having an average particle size of 1 μm was used as the inorganic compound containing alumina instead of the solid electrolyte, and that the electrode was produced so as to have a density of 1.5 g/cc and a thickness of 10 μm and on the negative electrode, and a nonaqueous electrolyte secondary battery was produced using the thereby-produced electrode, and the evaluation was conducted.

Example 28

An electrode was produced in the same manner as described in Example 1 except that a mixture obtained by mixing alumina ($Al_2O_3$) having an average particle size of 1 μm with mullite ($3Al_2O_3.2SiO_2$) having an average particle size of 1 μm at the ratio of 1:1 was used as the inorganic compound containing alumina instead of the solid electrolyte, and that the electrode was produced so as to have a density of 1.4 g/cc and a thickness of 10 μm, and a nonaqueous electrolyte secondary battery was produced using the thereby-produced electrode, and the evaluation was conducted.

Example 29

An electrode was produced in the same manner as described in Example 1 except that mullite ($3Al_2O_3.2SiO_2$) having an average particle size of 1 μm was used as the inorganic compound containing alumina instead of the solid electrolyte, and that the electrode was produced so as to have a density of 1.4 g/cc and a thickness of 10 μm, and a nonaqueous electrolyte secondary battery was produced using the thereby-produced electrode, and the evaluation was conducted.

Example 30

An electrode was produced in the same manner as described in Example 1 except that a mixture obtained by mixing mullite ($3Al_2O_3.2SiO_2$) having an average particle size of 1 μm with cordierite ($2MgO.2Al_2O_3.5SiO_2$) having an average particle size of 1 μm at the ratio of 1:1 was used as the inorganic compound containing alumina instead of the solid electrolyte, and that the electrode was produced so as to have a density of 1.4 g/cc and a thickness of 10 μm, and a nonaqueous electrolyte secondary battery was produced using the thereby-produced electrode, and the evaluation was conducted.

Comparative Example 1

An electrode was produced in the same manner as described in Example 1 except that the composite electrolyte layer was not included, and a nonaqueous electrolyte secondary battery was produced using the thereby-produced electrode, and the evaluation was conducted.

Comparative Example 2

An electrode was produced in the same manner as described in Example 1 except that the composite electrolyte layer was formed with a density of 2.7 g/cc and a thickness of 23 μm, and a nonaqueous electrolyte secondary battery was produced using the thereby-produced electrode, and the evaluation was conducted.

Comparative Example 3

An electrode was produced in the same manner as described in Example 1 except that the composite electrolyte layer was formed with a density of 0.8 g/cc and a thickness of 22 μm, and a nonaqueous electrolyte secondary battery was produced using the thereby-produced electrode, and the evaluation was conducted.

Comparative Example 4

An electrode was produced in the same manner as described in Example 2 except that the composite electrolyte layer was formed with a density of 2.7 g/cc and a thickness of 25 μm, and a nonaqueous electrolyte secondary battery was produced using the thereby-produced electrode, and the evaluation was conducted.

Comparative Example 5

An electrode was produced in the same manner as described in Example 2 except that the composite electrolyte layer was formed with a density of 0.8 g/cc and a thickness of 2 μm, and a nonaqueous electrolyte secondary battery was produced using the thereby-produced electrode, and the evaluation was conducted.

Comparative Example 6

An electrode was produced in the same manner as described in Example 3 except that the composite electrolyte layer was formed with a density of 0.5 g/cc and a thickness of 10 μm, and a nonaqueous electrolyte secondary battery was produced using the thereby-produced electrode, and the evaluation was conducted.

Comparative Example 7

Electrodes were produced in the same manner as described in Example 4 except that the composite electrolyte layer was formed with a density of 2.7 g/cc and a thickness of 5 μm, and a nonaqueous electrolyte secondary battery was produced using the thereby-produced electrode, and the evaluation was conducted.

TABLE 1

|  | Solid electrolyte | Average particle size of solid electrolyte (μm) | Location of composite electrolyte layer | Density of composite electrolyte layer (g/cc) | Thickness of composite electrolyte layer (μm) |
|---|---|---|---|---|---|
| Example 1 | $Li_{1.4}Al_{0.4}Ti_{1.6}(PO_4)_3$ | 1 | On positive electrode | 1.5 | 21 |
| Example 2 | $Li_{1.4}Al_{0.4}Ti_{1.6}(PO_4)_3$ | 1 | On negative electrode | 1.5 | 23 |
| Example 3 | $Li_{1.4}Al_{0.4}Ti_{1.6}(PO_4)_3$ | 1 | On separator | 1.3 | 22 |
| Example 4 | $Li_{1.4}Al_{0.4}Ti_{1.6}(PO_4)_3$ | 1 | On both electrodes | 1.5 | 20(on negative electrode), 21(on positive electrode) |
| Example 5 | $Li_{1.4}Al_{0.4}Ti_{1.6}(PO_4)_3$ | 1 | On negative electrode | 1.5 | 2 |
| Example 6 | $Li_7La_3Zr_2O_{12}$ | 2 | On negative electrode | 1.5 | 5 |
| Example 7 | $Li_{0.5}La_{0.5}TiO_3$ | 2 | On negative electrode | 1.5 | 4 |
| Example 8 | $Li_{3.6}Si_{0.6}PO_4$ | 1 | On negative electrode | 1.5 | 10 |
| Example 9 | LIPON | 3 | On negative electrode | 1.4 | 11 |
| Example 10 | $Li_{1.4}Al_{0.4}Ti_{1.6}(PO_4)_3$ | 1 | On positive electrode | 1 | 10 |
| Example 11 | $Li_{1.4}Al_{0.4}Ti_{1.6}(PO_4)_3$ | 1 | On negative electrode | 1 | 15 |
| Example 12 | $Li_{1.4}Al_{0.4}Ti_{1.6}(PO_4)_3$ | 1 | On positive electrode | 2.1 | 22 |
| Example 13 | $Li_{1.4}Al_{0.4}Ti_{1.6}(PO_4)_3$ | 1 | On negative electrode | 2.2 | 20 |
| Example 14 | $Li_7La_3Zr_2O_{12}$ | 2 | On negative electrode | 1.2 | 3 |
| Example 15 | $Li_7La_3Zr_2O_{12}$ | 2 | On negative electrode | 2.2 | 2 |
| Example 16 | $Li_{1.4}Al_{0.4}Ti_{1.6}(PO_4)_3$ | 1 | On positive electrode | 1.5 | 0.2 |
| Example 17 | $Li_{1.4}Al_{0.4}Ti_{1.6}(PO_4)_3$ | 1 | On positive electrode | 1.5 | 76 |
| Example 18 | $Li_{1.4}Al_{0.4}Ti_{1.6}(PO_4)_3$ | 1 | On positive electrode | 1.5 | 97 |
| Example 19 | $Li_{1.4}Al_{0.4}Ti_{1.6}(PO_4)_3$ | 9.8 | On positive electrode | 1.5 | 21 |
| Example 20 | $Li_{1.4}Al_{0.4}Ti_{1.6}(PO_4)_3$ | 0.1 | On positive electrode | 1.5 | 21 |
| Example 21 | $Li_{1.4}Al_{0.4}Ti_{1.6}(PO_4)_3$ | 5.5 | On positive electrode | 1.5 | 21 |
| Example 22 | $Li_{1.4}Al_{0.4}Ti_{1.6}(PO_4)_3$ | 7.8 | On positive electrode | 1.5 | 21 |

TABLE 2

|  | Inorganic compound containing alumina | Average particle size of inorganic compound containing alumina (μm) | Location of composite electrolyte layer | Density of composite electrolyte layer (g/cc) | Thickness of composite electrolyte layer (μm) |
|---|---|---|---|---|---|
| Example 23 | $Al_2O_3$ | 1 | On positive electrode | 1.5 | 10 |
| Example 24 | $Al_2O_3$ | 0.2 | On positive electrode | 1.5 | 10 |
| Example 25 | $Al_2O_3$ | 8 | On positive electrode | 1.5 | 15 |
| Example 26 | $Al_2O_3$ + LATP (Mixture ratio $Al_2O_3$:LATP = 1:1) | $Al_2O_3$ = 1, LATP = 1 | On positive electrode | 1.5 | 10 |
| Example 27 | $Al_2O_3$ | 1 | On negative electrode | 1.5 | 10 |
| Example 28 | $Al_2O_3$ + $3Al_2O_3 \cdot 2SiO_2$ (Mixture ratio $Al_2O_3$:$3Al_2O_3 \cdot 2SiO_2$ = 1: | $Al_2O_3$ = 1, $3Al_2O_3 \cdot 2SiO_2$ = 1 | On positive electrode | 1.4 | 10 |
| Example 29 | $3Al_2O_3 \cdot 2SiO_2$ | 1 | On positive electrode | 1.4 | 10 |
| Example 30 | $3Al_2O_3 \cdot 2SiO2$ + $2MgO \cdot 2Al_2O_3 \cdot 5SiO_2$ (Mixture ratio $3Al_2O_3 \cdot 2SiO_2$: $2MgO \cdot 2Al_2O_3 \cdot 5SiO_2$ = 1:1) | $3Al_2O_3 \cdot 2SiO_2$ = 1, $2MgO \cdot 2Al_2O_3 \cdot 5SiO_2$ = 1 | On positive electrode | 1.4 | 10 |

TABLE 3

|  | Inorganic compound containing alumina | Average particle size of inorganic compound containing alumina (μm) | Location of composite electrolyte layer | Density of composite electrolyte layer (g/cc) | Thickness of composite electrolyte layer (μm) |
|---|---|---|---|---|---|
| Comparative Example 1 | None | — | — | — | — |
| Comparative Example 2 | $Li_{1.4}Al_{0.4}Ti_{1.6}(PO_4)_3$ | 1 | On positive electrode | 2.7 | 23 |
| Comparative Example 3 | $Li_{1.4}Al_{0.4}Ti_{1.6}(PO_4)_3$ | 1 | On positive electrode | 0.8 | 22 |
| Comparative Example 4 | $Li_{1.4}Al_{0.4}Ti_{1.6}(PO_4)_3$ | 1 | On negative electrode | 2.7 | 25 |
| Comparative Example 5 | $Li_{1.4}Al_{0.4}Ti_{1.6}(PO_4)_3$ | 1 | On negative electrode | 0.8 | 2 |
| Comparative Example 6 | $Li_{1.4}Al_{0.4}Ti_{1.6}(PO_4)_3$ | 1 | On separator | 0.5 | 10 |
| Comparative Example 7 | $Li_{1.4}Al_{0.4}Ti_{1.6}(PO_4)_3$ | 1 | On both electrodes | 2.7 | 5(on negative electrode), 5(on positive electrode) |

TABLE 4

| | 10 C/0.2 C Capacity maintaining rate (%) | Capacity retention ratio after 200 cyc (%) | Amount of gas generated after 200 cyc (cc) |
|---|---|---|---|
| Example 1 | 90 | 83 | 2.5 |
| Example 2 | 90 | 85 | 3 |
| Example 3 | 90 | 80 | 3.3 |
| Example 4 | 89 | 88 | 1 |
| Example 5 | 93 | 87 | 4.1 |
| Example 6 | 90 | 84 | 3.4 |
| Example 7 | 91 | 85 | 3.8 |
| Example 8 | 89 | 84 | 3.5 |
| Example 9 | 80 | 86 | 3.5 |
| Example 10 | 95 | 80 | 3.5 |
| Example 11 | 96 | 83 | 3.6 |
| Example 12 | 80 | 78 | 1.5 |
| Example 13 | 81 | 75 | 1.6 |
| Example 14 | 90 | 80 | 4.2 |
| Example 15 | 92 | 85 | 3.8 |
| Example 16 | 95 | 87 | 4.3 |
| Example 17 | 88 | 80 | 0.5 |
| Example 18 | 87 | 80 | 0.4 |
| Example 19 | 80 | 83 | 3.3 |
| Example 20 | 96 | 87 | 1.4 |
| Example 21 | 85 | 84 | 2.5 |
| Example 22 | 80 | 83 | 3 |

TABLE 5

| | 10 C/0.2 C Capacity maintaining rate (%) | Capacity retention ratio after 200 cyc (%) | Amount of gas generated after 200 cyc (cc) |
|---|---|---|---|
| Example 23 | 90 | 77 | 3.5 |
| Example 24 | 90 | 79 | 3.5 |
| Example 25 | 92 | 76 | 3.6 |
| Example 26 | 92 | 79 | 3.5 |
| Example 27 | 90 | 77 | 3.5 |
| Example 28 | 89 | 76 | 3.7 |
| Example 29 | 89 | 75 | 3.8 |
| Example 30 | 88 | 74 | 3.8 |

TABLE 6

| | 10 C/0.2 C Capacity maintaining rate (%) | Capacity retention ratio after 200 cyc (%) | Amount of gas generated after 200 cyc (cc) |
|---|---|---|---|
| Comparative Example 1 | 90 | 66 | 9.8 |
| Comparative Example 2 | 0.1 | 2 | 2 |
| Comparative Example 3 | 95 | 77 | 9 |
| Comparative Example 4 | 0.1 | 2 | 2 |
| Comparative Example 5 | 93 | 78 | 9.2 |
| Comparative Example 6 | 94 | 74 | 8.6 |
| Comparative Example 7 | 0.1 | 2 | 1.7 |

When Comparative Example 1 is compared with Example 1, it can be confirmed that gas generation can be suppressed because of the presence of the composite electrolyte layer, and the cycle characteristics are high. In Comparative Example 1, a great amount of gas was generated due to the lack of the composite electrolyte layer, and cycle characteristics were deteriorated. When Comparative Example 1 is compared to Examples 2 and 3, it can be seen in Examples 2 and 3 that reduction in an amount of gas generated is achieved regardless of a location of the composite electrolyte layer. Furthermore, reduction in an amount of gas generated is achieved even when the thickness of the composite electrolyte layer is 2 μm as in Example 4. When Comparative Example 1 is compared to Examples 5 to 8, an amount of gas generated is reduced and the cycle characteristics are ameliorated because of the presence of the composite electrolyte layer, regardless of a type of the solid electrolyte. When Example 5 and Comparative Example 5 are compared, the density of the composite electrolyte layer is in the range of 1.0 g/cc to 2.2 g/cc in Example 5; thus, it can be understood that the capacity retention ratio after 200 cycles is high, and an amount of gas generated is also suppressed. In Comparative Example 5 on the other hand, the density of the composite electrolyte layer is less than 1.0 g/cc; thus, it can be understood that the capacity retention ratio after 200 cycles is decreased, and an amount of gas generated is increased.

When Comparative Example 2 is compared with Example 1, it can be seen that the cycle characteristics and the rate characteristics are greatly deteriorated because the density of the composite electrolyte layer is high in Comparative Example 2. When Comparative Example 3 is compared with Example 1, it can be seen that the cycle characteristics are deteriorated and an amount of gas generated is greater because the density of the composite electrolyte layer is low in Comparative Example 3.

In examples 23 through 30, the inorganic compound containing alumina was added to the composite electrolyte, instead of the solid electrolyte. As a result, results similar to the case where the solid electrolyte was added were obtained.

The above-described nonaqueous electrolyte secondary batteries having an electrode group in which the density of a composite electrolyte layer arranged between negative and positive electrodes is in a range of 1.0 g/cc to 2.2 g/cc, can suppress movement of decomposition products of an organic solvent as a result of charging and discharging, and suppress deterioration of the electrodes, and can provide better life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode group comprising:
   a positive electrode comprising a lithium composite oxide $LiM_xMn_{2-x}O_4$ ($0<x\leq0.5$, M is at least one selected from a group consisting of Ni, Cr, Fe, Cu, Co, Mg, and Mo) as a positive electrode active material;
   a negative electrode comprising a negative electrode active material;
   a composite electrolyte layer comprising at least one of a solid electrolyte and an inorganic compound containing alumina; and
   a separator, wherein
the composite electrolyte layer and the separator are arranged between the positive electrode and the negative electrode, and
a density of the composite electrolyte layer is in a range of 1.0 g/cc to 2.2 g/cc, and is substantially consistent within the composite electrolyte layer.

2. The electrode group according to claim 1, wherein the density of the composite electrolyte layer is in a range of 1.3 g/cc to 1.5 g/cc.

3. The electrode group according to claim 1, wherein a thickness of the composite electrolyte layer is in a range of 0.1 μm to 100 μm.

4. The electrode group according to claim 1, wherein a thickness of the composite electrolyte layer is in a range of 1 μm to 20 μm.

5. The electrode group according to claim 1, wherein the solid electrolyte is in a form of particles, and an average particle size of the solid electrolyte is in a range of 0.1 μm to 10 μm.

6. The electrode group according to claim 5, wherein the average particle size of the solid electrolyte is in a range of 0.1 μm to 5 μm.

7. The electrode group according to claim 1, wherein the solid electrolyte comprises at least one selected from a group consisting of perovskite-type lithium lanthanum titanium composite oxide, garnet-type lithium lanthanum zirconium-containing oxide, NASICON-type lithium aluminum titanium composite oxide, lithium calcium zirconium oxide, and an inorganic compound having a LISICON structure.

8. The electrode group according to claim 1, wherein the inorganic compound containing alumina is alumina.

9. The electrode group according to claim 1, wherein the positive electrode active material has a discharging potential of 4.5 V (vs Li/Li$^+$) or greater.

10. The group acct to claim 1, wherein the negative electrode active material comprises a titanium composite oxide.

11. The electrode group according to claim 10, wherein the titanium composite oxide comprises at least one selected from a group consisting of lithium titanium oxide, titanium oxide, niobium titanium oxide, and lithium sodium niobium titanium oxide.

12. A nonaqueous electrolyte secondary battery comprising:
the electrode group according to claim 1; and
a nonaqueous electrolyte.

13. A battery pack comprising the nonaqueous electrolyte secondary battery according to claim 12.

14. The battery pack according to claim 13 further comprising:
an external power distribution terminal; and
a protective circuit.

15. The battery pack according to claim 13 comprising a plurality of the nonaqueous electrolyte secondary battery, wherein
the nonaqueous electrolyte secondary batteries are electrically connected in series, in parallel, or in series and parallel.

16. A vehicle comprising the battery pack according to claim 13.

17. The vehicle according to claim 16, wherein the battery pack is configured to recover a regenerative energy of a power of the vehicle.

18. The electrode group according to claim 1, wherein there is no portion having a density distribution in the composite electrolyte layer beyond the density range of 1.0 g/cc to 2.2 g/cc.

19. The electrode group according to claim 1, wherein the composite electrolyte layer is an alumina layer.

* * * * *